United States Patent [19]

Fesmire et al.

[11] Patent Number: 5,203,359

[45] Date of Patent: Apr. 20, 1993

[54] UNITARY SYSTEM FOR RECYCLING USED CONTAMINATED MATERIAL FOR RE-USE

[75] Inventors: Robert H. Fesmire, Barrington, Ill.; Earl Spengler, Chino, Calif.; George F. Sekera, Jr., Willowbrook; Helmut Mueller, Rolling Meadows, both of Ill.

[73] Assignee: Ellis Corporation, Itasca, Ill.

[21] Appl. No.: 787,685

[22] Filed: Nov. 4, 1991

[51] Int. Cl.$^5$ ............................................. B08B 3/04
[52] U.S. Cl. .................................... 134/61; 134/120; 134/159; 134/163
[58] Field of Search ................. 134/61, 65, 69, 79, 134/120, 132, 153, 157, 159, 163; 68/27, 142, 143, 144, 145

[56] References Cited

U.S. PATENT DOCUMENTS

| | | |
|---|---|---|
| Re. 30,214 | 2/1980 | Bhavsar . |
| 33,661 | 11/1861 | Parkhurst ........................ 68/142 |
| 194,905 | 9/1877 | Hawver ........................ 68/142 X |
| 1,168,799 | 1/1916 | Grier ........................ 134/120 X |
| 2,433,552 | 12/1947 | Haney et al. ................ 134/120 X |
| 3,011,637 | 12/1961 | Felsch et al. . |
| 3,516,841 | 6/1970 | Haveman . |
| 3,707,858 | 1/1973 | Gulzow et al. . |
| 3,811,568 | 5/1974 | Pearson . |
| 3,852,046 | 12/1974 | Brown . |
| 3,859,404 | 1/1975 | Immel et al. . |
| 3,878,699 | 4/1975 | Steinort . |
| 3,909,291 | 9/1975 | Leong ........................ 134/159 X |
| 3,928,181 | 12/1975 | Iseman . |
| 4,000,031 | 12/1976 | Acobas . |
| 4,009,235 | 2/1977 | Bober . |
| 4,020,659 | 5/1977 | Bhavsar ........................ 68/27 |
| 4,033,907 | 7/1977 | Wolf . |
| 4,094,172 | 6/1978 | Arendt . |
| 4,119,533 | 10/1978 | Saitoh et al. . |
| 4,162,880 | 7/1979 | Cobbs, Jr. et al. . |
| 4,187,172 | 2/1980 | Datsenko et al. . |
| 4,194,926 | 3/1980 | Barnsbee . |
| 4,207,986 | 6/1980 | Cerroni . |
| 4,234,415 | 11/1980 | de Tuya Casuso . |
| 4,314,674 | 2/1982 | Cerroni . |
| 4,379,525 | 4/1983 | Nowicki et al. . |
| 4,422,309 | 12/1983 | Schmidt et al. . |
| 4,454,030 | 6/1984 | Young . |
| 4,494,265 | 1/1985 | Schmidt et al. . |
| 4,607,509 | 8/1986 | Stoll . |
| 4,616,372 | 10/1986 | Stoll . |
| 4,617,111 | 10/1986 | Grimm et al. . |
| 4,619,121 | 10/1986 | Mollerus et al. . |
| 4,694,665 | 9/1987 | Stoll . |

(List continued on next page.)

Primary Examiner—Philip R. Coe
Attorney, Agent, or Firm—Mason, Kolehmainen, Rathburn & Wyss

[57] ABSTRACT

A unitary system for recycling contaminated solid material such as plastic chips having contaminants on the surface includes an elongated vessel having an inlet for contaminated solid material adjacent one end and an outlet for cleaned solid material at a second end. A plurality of divider walls are spaced apart along the length of the vessel to form a plurality of discrete, separate, spaced apart treatment chambers and each chamber is adapted for holding an individual charge of solid material being treated. Charges in the chambers are moved simultaneously from chamber to chamber from the inlet toward the outlet. Piping is provided for introducing various liquid media into the respective treatment chambers for washing away the contaminants from the surface of the solid material. During each operational cycle, the vessel is rotated at a suitable speed in an oscillating fashion to provide washing action as basher bars move the contaminated solid material through the liquid medium. Each chamber is provided with a plurality of radially oriented basher bars which force the floatable solid material downwardly and through the liquid medium for removal of the contaminants. After a treatment cycle, the liquid medium and contaminants carried thereby are removed from the chamber and the contaminated liquid medium is recycled by removal and separation of the contaminants therefrom so that the liquid medium can be used again in the same or another system.

12 Claims, 16 Drawing Sheets

U.S. PATENT DOCUMENTS

| | | |
|---|---|---|
| 4,719,933 | 1/1988 | Jackson ............................ 134/132 X |
| 4,728,045 | 3/1988 | Tomaszek . |
| 4,746,422 | 5/1988 | Grimm . |
| 4,809,854 | 3/1989 | Tomaszek . |
| 4,830,188 | 5/1989 | Hannigan et al. . |
| 4,844,106 | 7/1989 | Hunter et al. . |
| 4,844,351 | 7/1989 | Holloway . |
| 4,848,107 | 7/1989 | Stoll . |
| 4,940,187 | 7/1990 | Lee . |
| 4,944,868 | 7/1990 | Jay, Sr. et al. . |
| 4,951,458 | 8/1990 | Steinort . |
| 4,974,781 | 12/1990 | Placzek . |
| 4,979,682 | 12/1990 | Voelker . |
| 4,981,876 | 1/1991 | Grimmer . |
| 5,011,087 | 4/1991 | Richardson et al. . |
| 5,022,985 | 6/1991 | Nugent . |

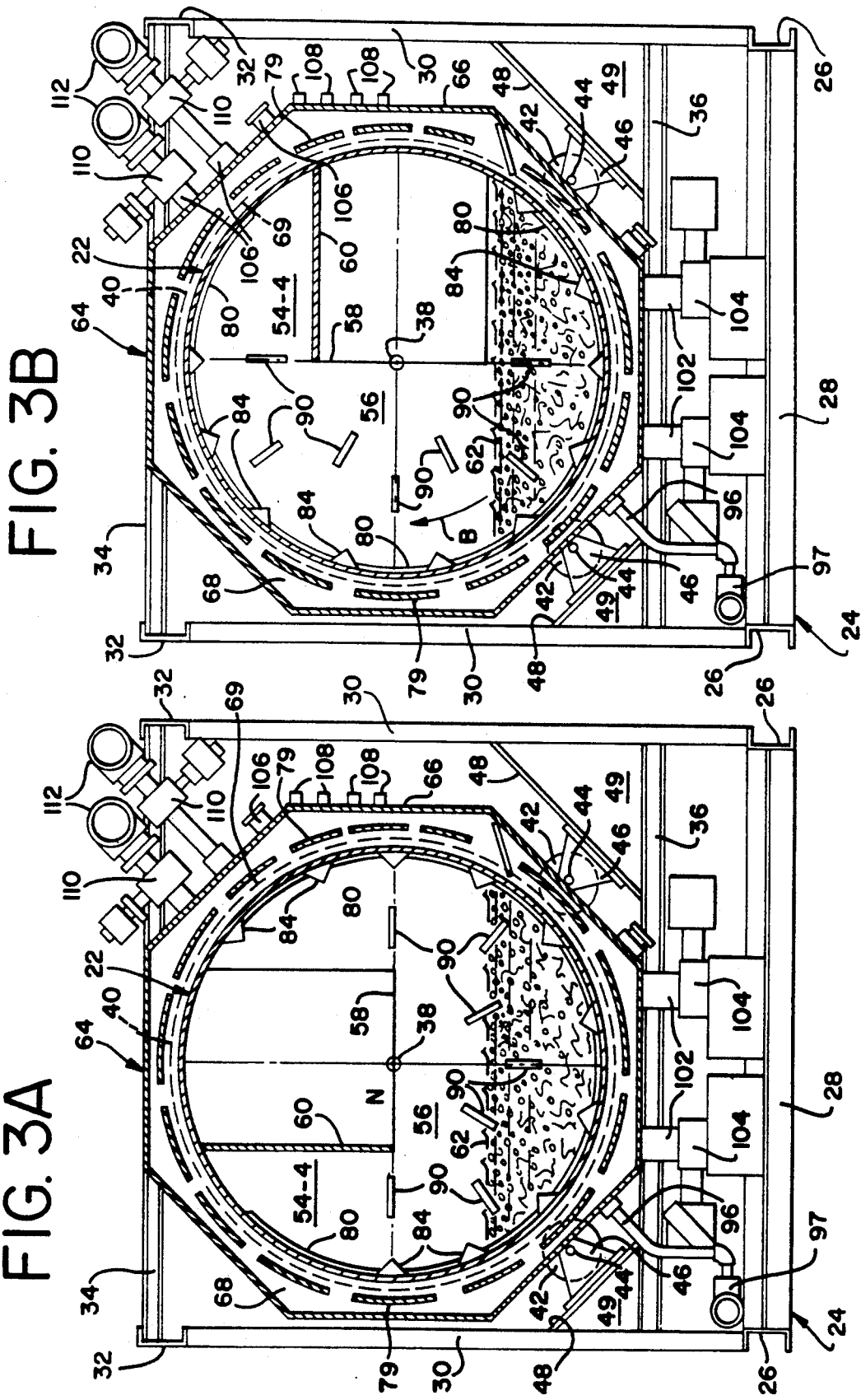

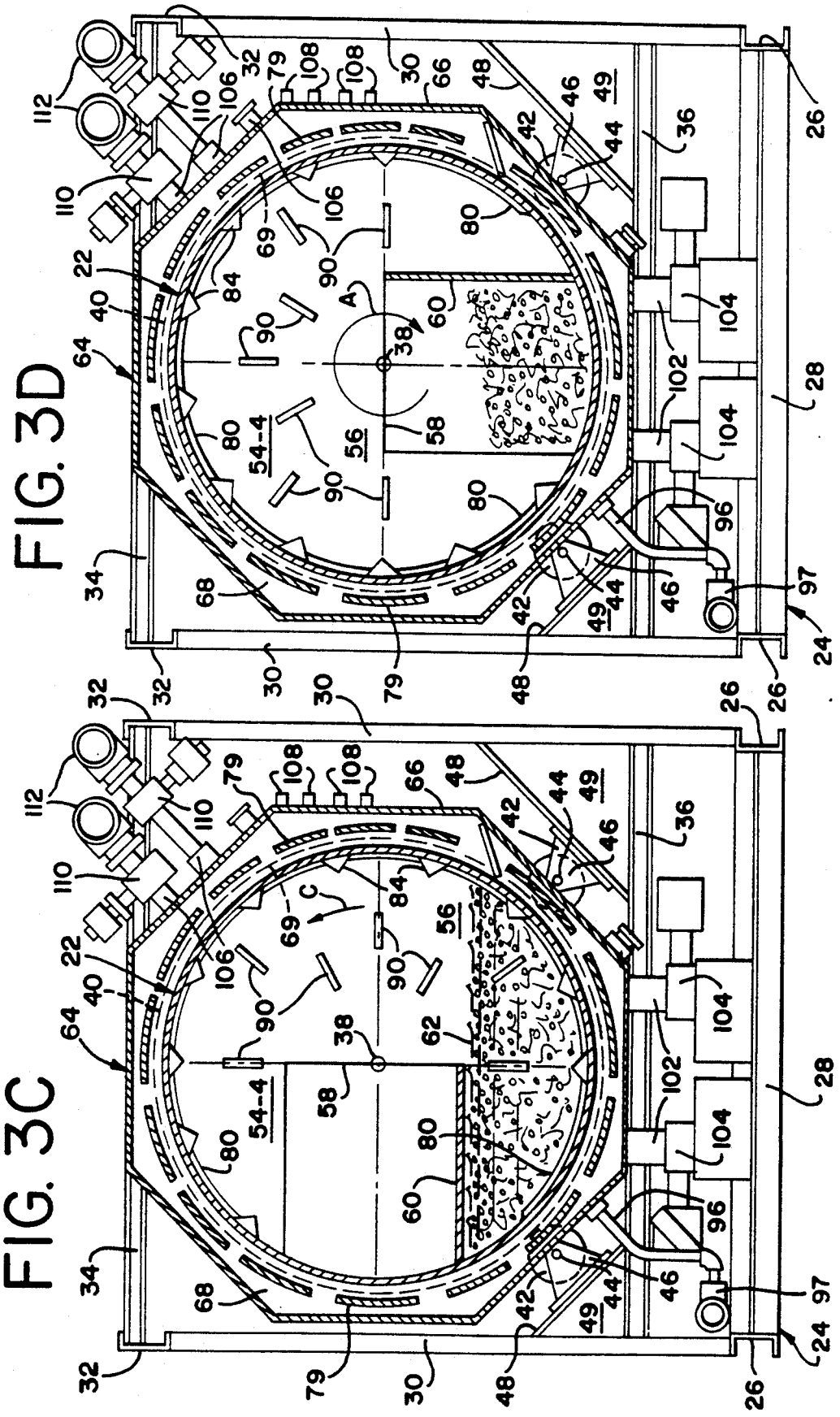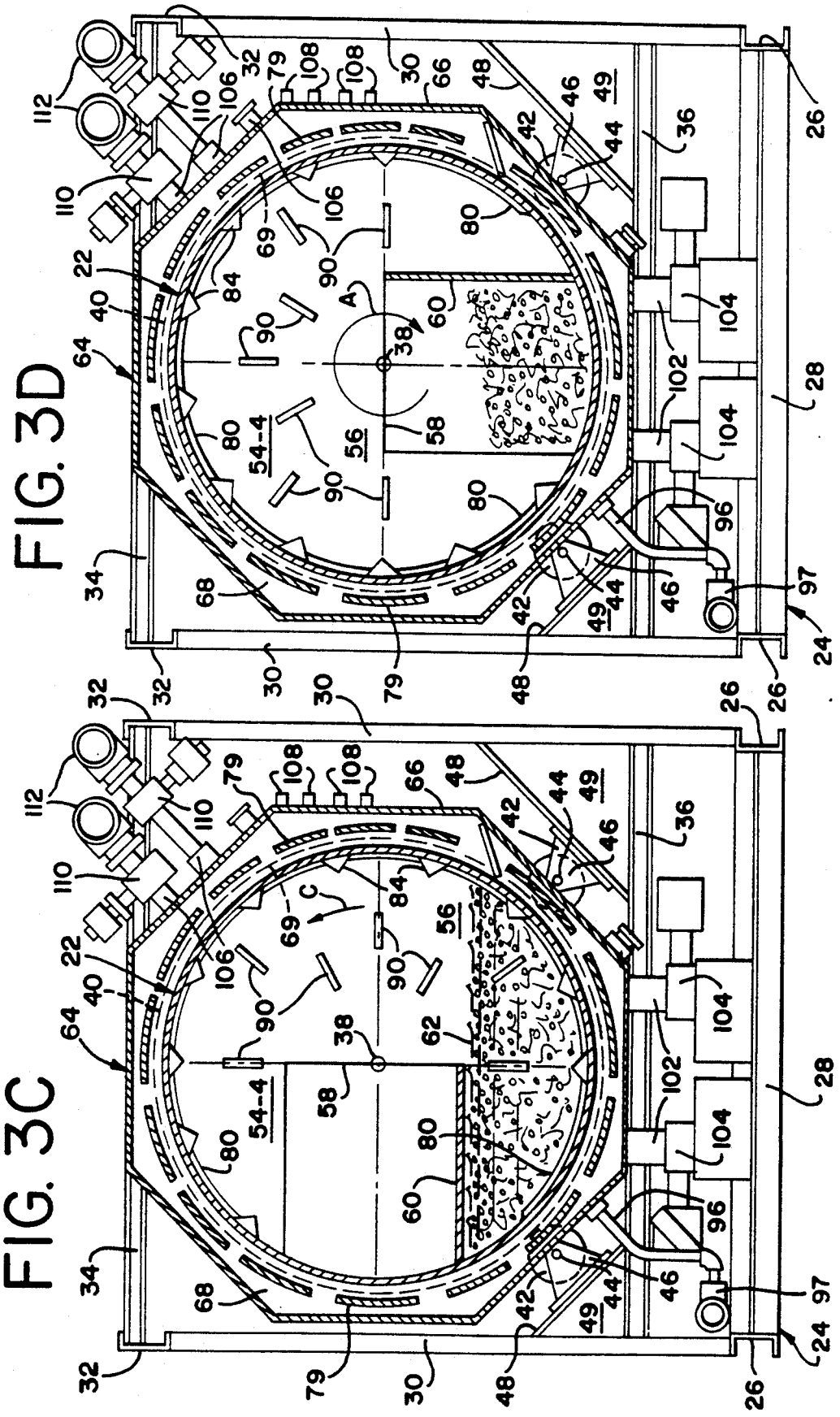

UNITARY SYSTEM FOR RECYCLING USED CONTAMINATED MATERIAL FOR RE-USE

BACKGROUND OF THE INVENTION

1. Field of the Invention

The present invention relates to a new and improved unitary system and process for recycling contaminated material such as plastic chips which are in ground-up or shredded form obtained from plastic containers, retainers, wrappers, bags, films, and the like, so that the material may be used again. The system provides a unitary apparatus capable of operating with a wide variety of variables in terms of hot or cold liquid media with or without chemicals and different drying processes. Essentially, the present invention is directed toward a tremendous ecological problem caused by the wide usage of a wide variety of different types of plastic materials for containing and packaging foodstuffs, liquids of all types, films, wrappers, bags, and the like, employing resinous plastic material as the basic forming medium.

2. Background of the Prior Art

Present day efforts at removing contaminants from reground and/or shredded plastic materials are fraught with difficulty in that there is not available a unitary machine for handling the material after a grinding up or shredding process to provide an output that is suitable for reuse in plastic products. Moreover, material handling systems that are currently used tend to introduce air into washing mediums, thereby creating unwanted foam which is difficult to remove. Moreover, there is no acceptable system for recycling or reprocessing spent or dirty liquid media so that the liquid can be re-used in treating successive batches of plastic chips to be recycled. In addition, a substantial quantity of energy in the form of heat is lost and the overall efficiency of many processes is reduced thereby.

Oftentimes special solvents or chemicals are needed for dissolving certain substances or contaminants on the surface of reground plastic material and presently there are no efficient systems for saving these chemicals and cleansing the same for re-use in treating subsequent batches of material or for utilizing the chemicals in other areas.

In general, the fragmented approach of the industry to the monumental problem of recycling the great volume of plastic material from used containers, retainers, films, wrappers, bags, and the like, has not been dealt with in an environmentally sound and cost effective manner. Moreover, there are no systems currently available that are efficiently handling the dirt, dried milk, foodstuffs, oils, detergents, paper labeling adhesives, glues and films which are removed from the plastic materials in a recycling process.

One system that is in use involves the introduction of shredded or ground-up plastic chips into a large vat of liquid medium. The vat is provided with a plurality of propeller-type agitators to move the liquid over the surface of the chips. This system is not effective for a number of reasons which include, (1) the introduction of air into the process producing unwanted foam which later on requires an anti-foaming compound or some mechanical foam breaker means of destroying the foam that is produced. (2) The action of the propeller is sometimes effective to further grind-up or greatly reduce the size of plastic chips to be recycled and some of the chips are reduced to a consistency of fine powder which is then lost and not available for re-use. Some systems can discharge large volumes of soiled, solids-laden, liquid medium from a recycling operation into a sanitary system or sewage treatment system in a manner that is not an environmentally desirable procedure. This results in the need for further treatment and removal of the process liquid medium to eliminate and separate out the contaminants removed from the plastic chips and from the liquid medium.

U.S. Pat. No. 3,011,637 discloses a device including a rotatable drum having means for discharging and separating heavy and light fractions of materials known as float and sink particles.

U.S. Pat. No. 3,516,841 discloses a system for separating and reclaiming components from metallic-plastic laminate structures wherein wider and heavier components are separated out after shearing and grinding of the input material.

Gulzow et al. U.S. Pat. No. 3,707,858 discloses a washing machine having a drum rotatable about a horizontal axis and divided axially into a plurality of washing and rinsing compartments.

The Pearson U.S. Pat. No. 3,811,568 discloses a machine for separating plastic parts from runners used in molding the parts for collecting the runners to use again in plastic molding operations.

The Brown U.S. Pat. No. 3,852,046 discloses a method for recycling waste plastics and products by first grinding the materials into particulate form and thereafter washing the same to remove non-plastic material therefrom. The remaining materials are then heated to a temperature above the softening point of the lower melting thermoplastics but below the temperature of the softening point of the highest melting thermoplastics contained in the mixture. The resulting recycled material may then be used with asphaltic compositions or cellulosic material as a filler.

The Emil et al. U.S. Pat. No. 3,859,404 discloses a method for densifying styrene foam by heating and exposure to air pressure followed by clenching to produce a high density resin from scrap foam material.

Iseman U.S. Pat. No. 3,928,181 discloses a cottonseed and cockleburr separator where material is fed into a trough containing liquid wherein the cottonseeds sink towards the bottom and the lighter cockleburr material tends to move to the top. Screw conveyors are utilized in sloping trough enclosures.

Kolbus U.S. Pat. No. 4,000,031 discloses a method and apparatus for recovery of plastics and non-plastics from plastic coated waste material employing a helical screw flight within a perforated drum rotatable in a tank.

Bober U.S. Pat. No. 4,009,235 discloses a process for reclaiming extruded plastic resins by forming a plastic rope of resin with a rotating funnel or other device used to gather the hot molten plastic waste and twist it into the shape of a rope which is then passed through a cooling bath and pinch rolls.

U.S Pat. No. 4,033,907 discloses a system for reclaiming waste plastic material of a molecularly oriented type to facilitate subsequent washing, separating and melt processing steps. This system also discloses the use of a hot caustic solution for eliminating the growth of bacteria and mold on the recyclable plastic material.

Arendt U.S. Pat. No. 4,094,172 discloses a device for adding and/or removing fluid media from a rotating drum such as a washing machine Saitoh et al. U.S. Pat. No. 4,119,533 discloses a method of separating hydrophobic plastics from a plastics mixture wherein the plastics having a high hydrophobicity tend to float on the aqueous liquid mixture surface.

Hobbs, Jr., et al. U.S. Pat. No. 4,162,880 discloses a scrap plastic recovery system wherein a hammer mill and separator are used for removing foreign objects and melting batches of homogeneous chips for a pelletizer used to make solid pellets.

Detsinko et al. U.S. Pat. No. 4,187,172 discloses an apparatus for separating trash from less heavy firm articles in a flow of liquid employing a rotary perforated element with helical flights on the inner and outer surface thereof.

Barnsbe U.S. Pat. No. 4,194,926 discloses an apparatus and method for selectively reclaiming parts from plastic film cartridges using a series of specific gravity separation tanks.

Dettmar U.S. Pat. No. 4,200,967 discloses a system for reclaiming plastic polymer from scrap plastic film rolls by cutting and splitting the same while on a paper core.

Cerrone U.S. Pat. No. 4,207,986 discloses apparatus for separating plastic film from paper, particularly useful in waste recycling systems and employing flighted belt conveyors with rotary reels used for picking up lighter components of a mixture of scrap.

Detwoyadesusso U.S. Pat. No. 4,234,415 discloses an apparatus for separating solids of different specific gravities out of a mixture thereof including frustoconical separation chambers rotatable about a horizontal axis.

Cerroni U.S. Pat. No. 4,314,674 discloses a process for separating paper from plastic existent in solid urban waste by partially tricurating the mixture to reduce the paper components to small particle size ground condition while the plastic film component is generally unchanged.

Fagnant et al. U.S. Pat. No. 4,342,396 discloses a separator for separating small parts from a mixture of parts of various different sizes and includes a drum rotatable about a vertical axis.

U.S. Pat. No. 4,362,276 discloses a method and apparatus for recovering and separating metal and plastic material from plastic insulated wiring.

Nowicki et al. U.S. Pat. No. 4,379,525 discloses a batch process for recycling plastic container scrap including a water process for removing labels and eventually floating plastic granules over a weir collected for deep watering.

Fish U.S. Pat. No. 4,433,925 discloses a method of separating plastic bottles and caps or portions thereof by mechanically cutting through both the bottle and the bottle cap.

U.S. Pat. No. 4,448,737 discloses a method and apparatus for producing foamed products from a mix of reclaimed plastic foam material and foamable version plastic resins. The Johnson patent discloses a feed hopper having a rotatable cyclical agitator for moving and mixing reclaimed plastic material and new virgin material prior to introduction into a twin screw compressor.

Young U.S. Pat. No. 4,454,030 discloses a separating machine for separating acceptable molded parts from the material output from a molding machine so that the sprues and other runners and defective parts can be recycled.

Grimm et al. U S. Patent No. 4,617,111 discloses a method for the separation of a mixture of polyvinylchloride and polyethylene teraphalate utilizing a chemical solution which is absorbed in the polyvinylchloride.

Morrass et al. U.S. Pat. No. 4,619,121 discloses a sealing system for tunnel washing machines for removal of gas or liquid media from a rotating drum.

The West et al. U.S. Pat. No. 4,635,862 discloses a rotary granulator for communuting waste plastics material for recycling.

Fagnant U.S. Pat. No. 4,723,717 discloses a rotary shearing/cutting machine for cutting, shearing and shredding or otherwise communuting objects and articles for disposal purposes such as thermoplastic materials from molding operations, sprues, runners and defective molded articles.

Tomaszek U.S. Pat. Nos. 4,728,045 and 4,809,854 disclose a method and apparatus for reclaiming bonded together tube resin articles for reclaiming the reusable resin materials from bottles and other scrap items.

Grimm U.S. Pat. No. 4,746,422 discloses a method for the separation of a mixture of plastic material and contaminants utilizing a two phase solution composed of a halogenated hydrocarbon and water.

U.S. Pat. No. 4,830,188 discloses a system for plastic separation and recycling methods wherein light and heavy plastic fractions are separated from one another and contaminants are removed therefrom.

The Hunter et al. U.S. Pat. No. 4,844,106 discloses a method and apparatus for cleaning shards such as clay pigeons for fragments of debris and contaminant articles ready for recycling.

Holloway U.S. Pat. No. 4,844,351 discloses a method for separation recovery and recycling of plastics from municipal solid waste wherein a rotating drum mounted on a sloping axis includes a plurality of generally helically extending flights for mechanical agitation of the municipal solid waste material.

Lee U.S. Pat. No. 4,940,187 discloses a systematic equipment system for recycling raw materials from waste wires so that metallic wire material is separated from plastic insulating materials on the wire.

Jay, Sr., et al. U.S. Pat. No. 4,944,868 discloses a process and apparatus for separating plastics from contaminants employing a separation tank, a wash tank, a rinse tank a lift conveyor and a material dryer.

Ingram et al. U.S. Pat. No. 4,964,512 discloses a recyclable film package for photographic film so that the material therein may be reused.

Placzek U.S. Pat. No. 4,974,781 discloses a method and apparatus for preparing paper containing and plastic containing waste materials for component fraction separation and utilizes an elongated rotary drum mounted on a sloping axis and employing a plurality of radially inwardly extending flights around the surface of a first portion and a plurality of helical flights around a second portion of the drum.

Volker U.S. Pat. No. 4,979,682 discloses a system for reclaiming synthetic material and metal from a synthetic metal scrap combination but first communuting the scrap and pulverizing the particles to obtain a fluidized bed of synthetic fibers and metal and utilizing air flow to separate the fibers from the metal.

Rimmer U.S. Pat. No. 4,981,876 discloses a process for separating vinyl skin from foam backing material and recovering the separated components by mixing the small chips of composite plastics with a quantity of water to swell and break the cell structure of the foam at the foam vinyl interface.

Richardson et al. U.S. Pat. No. 5,011,087 discloses a method of az apparatus for continuously treating communuted synthetic plastic containers and products having contaminants bonded thereto for recycling purposes. The system includes an elongated horizontal drum or vessel employing one or more elongated helical screws therein for agitation of a liquid medium in which the material is contained.

Bridge et al. U.S. Pat. No. 5,644,000 discloses a bent inlet deflector for use with a granulator wherein scrap plastic is to be fed into a granulating device.

Nugent U.S. Pat. No. 5,022,985 discloses a process for the separation and recovery of mixtures containing plastics and other materials using flotation and aqueous dispersion. The process is said to be useful for separating polyethylene and polyvinyl chloride from communuted wire and cable scrap.

OBJECTS OF THE PRESENT INVENTION

The present invention is related and directed toward a new and improved unitary system for recycling used contaminated material for reuse.

More particularly it is an object of the invention to provide a new and improved unitary system for cleaning and treating contaminated plastic chips, ground or shredded up from used plastic containers, retainers, film wrappers and/or bags.

Another object of the invention is to provide a new and improved tunnel-type washer for recyclable plastic materials and in particular, a tunnel-type washer which is useful to provide a wide variety of variable formulas for cleaning a wide variety of consumer-type plastics such as regrinds or shredded forms of containers, can retainers, plastic films and wrappers.

Another object of the present invention is to provide a new and improved unitary system for cleaning recyclable plastic material for reuse wherein a minimal amount of air or gas is introduced into the system thereby avoiding the generation of foam.

Another object of the present invention is to provide a new and improved washing machine of the character described adapted to receive sequential charges of material at one end for successive treatment phases until a discharged clean product is available at an opposite end.

Another object of the present invention is to provide a new and improved washing system for recycling plastic resinous materials wherein liquid media is processed through a sludge thickener so that a high percentage of solids are removed and clean media can be reused in the process.

Another object of the present invention is to provide a new and improved washing and scrubbing system for shredded or ground up plastic material which provides for reuse of processing liquid media used in the system.

Another object of the present invention is to provide a new and improved unitary system for recycling plastic bottles, parts, films and post-consumer items so that further cleaning and handling can be achieved without danger.

Another object of the present invention is to provide a new and improved plastic recycling system wherein recycled plastic material in chip or fragmented form is produced that is free of dried foods, oils, detergents, paper labeling materials, glues and other foreign contaminants.

Another object of the present invention is to provide a new and improved recycling system for waste or used plastic materials which is capable of handling elements such as plastic chips or fragments that are both more and less dense than a liquid cleaning media and which does not tend to further grind or reduce the size of the elements introduced.

Another object of the present invention is to provide a new and improved unitary recycling system which is capable of handling a wide variety of intermixed plastic materials having different specific gravities and having different physical forms and chemical formulations.

Another object of the present invention is to provide a new and improved unitary system for recycling and making used and contaminated materials ready for reuse which is environmentally safe, which is economical to operate and which requires a minimum amount of heat or other energy to be expended and a minimum amount of fresh makeup liquid medium to be required.

It is another object of the present invention to provide a new and improved apparatus of the character described employing a modified shroud member having a sump with means for varying the volume thereof to facilitate rapid transfer of liquid media into and out of the associated cell or chamber.

BRIEF SUMMARY OF THE PRESENT INVENTION

The foregoing and other objects and advantages of the present invention are accomplished in a new and improved unitary system for recycling contaminated or used material such as plastic shreds or chips ground up or shredded from plastic containers, retainers, wrappers, bags, films, and the like, having dirt, soil and other various types of contaminants on the surfaces thereof. The system includes an elongated, horizontal container or vessel mounted for rotation about a central axis and having an inlet for contaminated materials adjacent one end and an outlet for cleaned materials at the opposite end. A plurality of annular divider walls are spaced apart along the length of the vessel to form a plurality of separate, discrete, spaced apart treatment chambers or cells. Each cell is designed to hold an individual charge or quantity of material as the material is subjected to a particular type of treatment taking place in the cell and the charges are moved simultaneously from one cell or chamber to the next cell or chamber along the length of the vessel with each charge moving in sequence through the cells from the inlet to the outlet. A piping system is provided for introducing the various types of liquid media into the respective treatment chambers for heating, cooling and/or washing away or chemically removing various contaminants from the surfaces of the soiled plastic material. During each operational cycle, the vessel is rotated in an oscillatory fashion at a suitable speed so that in each cell or chamber a plurality of radially oriented basher bars may churn through the wash media forcing the lighter weight material, which tends to float to the top of liquid, downwardly and through the liquid to agitate and wash the contaminants, soil and dirt therefrom. The churning action creates violent movement of the contaminated material relative to the wash media dislodging contaminants for the soiled plastic chips. After or during each phase of a treatment cycle, the liquid media and the contaminants collected therein are removed from the chamber and the liquid media is then recycled by removal and separation of the contaminants in a sludge thickener process which cleans and separates the contaminants from the liquid media which may then be reused in the same system or in another different system, as the case may be. The liquid wash media can be removed from a cell on a continuous basis during an operational cycle of oscillation and if the wash media is relatively clean can be redirected for use elsewhere without passing through a sludge thickener.

BRIEF DESCRIPTION OF THE DRAWINGS

For a better understanding of the present invention, reference should be had to the following detailed description taken in conjunction with the drawings, in which:

FIG. 3A is a transverse cross-sectional view of the apparatus taken substantially along lines 3A—3A of FIG. 2;

FIG. 3B is a transverse cross-sectional view similar to FIG. 3A but illustrating the rotational position of a containment vessel in an alternate position;

FIG. 3C is a transverse cross-sectional view similar to FIG. 3A illustrating a rotational position of the treatment vessel in yet another alternate rotational position;

FIG. 3D is yet another transverse cross-sectional view similar to FIG. 3A illustrating the containment vessel of the apparatus in yet another rotational position wherein materials in each compartment of the vessel are simultaneously transferred into the next adjacent compartment or section;

DESCRIPTION OF PREFERRED EMBODIMENTS OF THE PRESENT INVENTION

Figure 1:
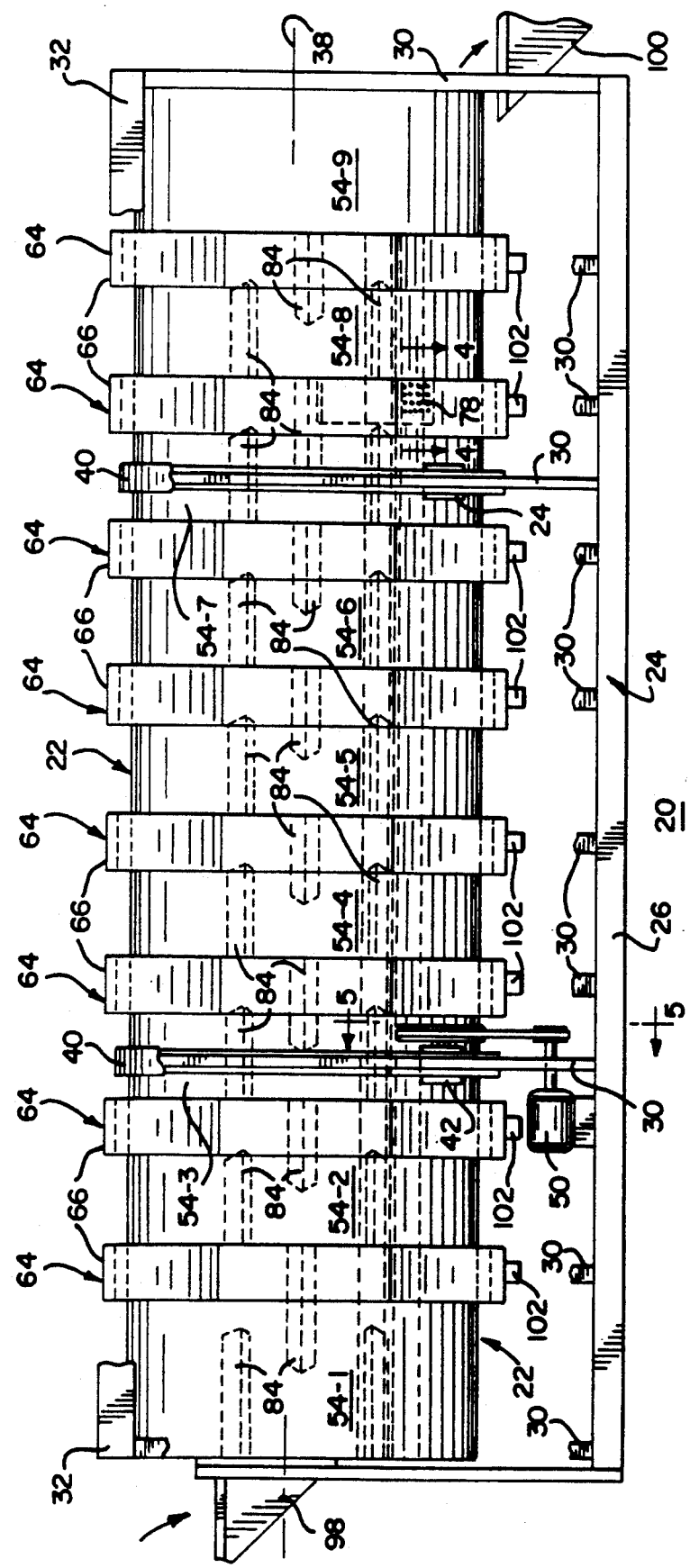
FIG. 1 is a side elevational view of a new and improved unitary treatment apparatus designed for recycling used contaminated material for recycling purposes.

The present invention is directed towards a system for recycling and reclaiming waste or spent plastic material used in plastic bottles, containers, films, bags and a host of other post-consumer items which in the past normally have found their way into waste disposal systems and landfills. A wide variety of different types of plastic materials are commonly intermixed and along with these materials there are contaminants such as soil, dirt, residues such as dried foods, oils, detergents, paper, adhesives and other contaminants, both liquid and solid, which must be separated from the plastic material itself. These plastics have different densities and different chemical characteristics and usually contain materials such as PET, polyethylene terephalate, used in pop bottles having a relatively high density and tending to sink in a water bath; HDPE, high density polyethylene, used for milk bottles; LDPE, low density polyethylene, used for plastic wrappers, bags and films; a copolymer of HDPE which is commonly used in detergent and oil bottles or containers; and a group of plastic materials such as ABS; acetyls; acrylic; nylon; polyolefin; polypropylene; polyvinylchloride; polystyrene; polycarbonates and other thermoplastic and engineering plastic material.

After the waste plastic materials are reduced by shredding, chipping, grinding, or the like, to a useful size, for example, about the size of a common soap flake, the product, referred to herein as plastic chips, are considerably larger in particle size than powders and/or granules such as the size of common silica sand The term "plastic chips" can include fragments, chips, shreds, and small elements of material of many types.

The system of the present invention employs a unique and unitary, continuous, yet semi-compartmented washing apparatus which imparts a high degree of mechanical washing action to the materials in a liquid media without chopping or further cutting up the product and thereby improving the value of the product that is cleaned and reclaimed.

Usually, the plastic chips are formed in a grinder or shredder and it is desirable that air not be introduced into the washing action because of the tendency to form foams which are hard to handle. Oftentimes, anti-foamant compounds are needed, especially when lighter density plastic materials are involved. Hereinafter the term "plastic chips" as used includes all types of plastic materials of uniform or of mixed and assorted colors, densities and types including those types of materials mentioned specifically.

The present invention provides the advantage of flexibility in process parameters. Dependent on the source of the plastic materials, the treatment and liquid medium used is chosen so that the contamination that is present will be removed in an efficient and rapid manner and a formula is developed to provide a variety of mechanical wash actions, the length of time for which a product is exposed to wash action, the variable temperatures and various chemicals in addition that are used with the purpose of removing the contaminants from the plastic material. When lesser mechanical washing action is utilized, usually a longer time frame is required for increased amounts of chemical additions. Moreover, a reduction of one or more of these components in the washing formulation may or may not require increase or decrease of other components used. In known systems, plastic particles are pushed into areas where agitation and washing action is minimal and oftentimes propeller-type agitators tend to further grind or chop the materials into fines that are eventually lost and pose an environmental burden.

Many proposed systems do not provide a comprehensive process for recycling the washing media, either water or chemically treated or heated water, so that the recycled wash media can be utilized again and again and the soil or solid-laden material discharged therefrom is sometimes a burden to sanitary sewer systems. Such discharges must be environmentally safe.

In the present invention, a sludge thickener is utilized for providing clean, hot or cold liquid media or process liquid by continuously removing settleable, suspended or floatable solids without removing dissolved chemicals that may be present and without the unnecessary removal of heat. Chemical consistency of the treatment is maintained by addition of chemicals only when required so that efficiency in terms of fresh water used, chemicals used, energy and wastewater disposal is achieved and costs minimized.

Briefly, a preferred embodiment of unitary apparatus of the present invention comprises an elongated containment vessel or drum rotatable about a generally horizontal axis and having an inlet for treated or untreated scrap and waste plastic chips and an outlet at the opposite end for discharge of the cleaned material which is ready for reuse and which has been cleansed of food, beverages, metal, casual matter, labels, adhesives, dirt, grime, washing liquids, solvents, and other items in the treatment process. The elongated drum is divided into a plurality of separate sections or chambers along the length thereof and spaced in sequence longitudinally along the drum axis from end to end. During a washing cycle, the drum is driven to oscillate or rotate about the axis in opposite directions through an angular range of approximately 180° to 270° at a suitable speed range of, for example, 10 to 20 RPM.

At the end of an operating cycle of agitating mechanical wash action, the drum is then rotated one complete revolution in a direction so as to simultaneously transfer the charge of material contained in each drum or cell section to a next successive adjacent cell or drum section for further treatment. In effect, the complete operational treatment of an initial charge of material from the inlet end of the drum to the outlet end may comprise as many as four, five, six or more sequential phases or stages of treatment with each phase being carried out in a particular section or sections and the whole operational treatment thus comprises a continuing sequence of treatment of separate charges of material carried out in succession along the length of the drum.

In a first phase of treatment, a weighed charge of plastic chips to be recycled is introduced into a first, prewash or soaking section or chamber within the drum and a hot or cold wetting liquid, usually water but sometimes including other solvents, is injected into the cell or chamber until an upper liquid level is reached wherein all of the plastic chips in the charge are wetted. The upper level of the liquid media is generally below the center axis of rotation of the drum. In this first wet-down or soaking section, there are provided a plurality of spaced apart, radially oriented, longitudinally extending, blades or basher bars which are active to forcefully move the plastic chips tending to float downwardly into the water and through towards the lower extremity of the drum over substantially the entire transverse cross-sectional area of the charge of plastic chips. The bars may engage the plastic chips directly, or may generate movement of the plastic chips by churning the liquid to create a violent and intense washing action over the surfaces of the charges of plastic chips in the liquid media.

As the drum oscillates back and forth, at an appropriate speed rate, intense agitation and continuous wetting of the plastic chips occurs. During this first wetting phase of operation, paper and other labels and some of the adhesives used are softened and/or much of the contaminating foreign matter such as general soil, food and dried liquids is picked up and absorbed in the liquid wash medium. At the end of a selected time cycle, or continuously during the phase, the liquid medium containing the contaminants absorbed therein and carried therein is drained away and the fully wetted plastic chips are then transferred in preparation for the next phase into the next drum section by rotation of the drum in one direction for a complete 360° revolution or turn.

The wash liquid is generally but not entirely removed before the transfer of the charge of plastic chip material into the next drum section occurs. An amount of wetting liquid may also be introduced during the transfer rotation to help in the conveyance and flushing of the plastic chips into the next drum section in readiness for the next stage or phase of operation. If more time is required for a particular phase than is required for the shortest time sequence phase needed in the whole process, then a second or additive phase can be provided for the phase requiring more time. For example, when a shortest time period required to complete any of the sequential phases is six minutes or one-tenth of an hour and some of the other phases such as soaking, prewash or drying may require ten to twelve minutes, two sequential stages of presoaking, prewash or drying may be provided in successive drum sections. Normally by the end of the first phase of presoaking or prewashing, a great deal of contaminant matter is removed and carried away from the plastic chips usually including softened or pulped paper labels, dirt, grime, food remnants and other material contained in the original plastic container.

In a second washing phase, the more water insoluble material that is more tenacious and hardened onto the surface of the plastic chips is removed. This material includes labels and adhesives and removal may be accomplished by the introduction of a heated scrubbing liquor, usually water, or water containing a detergent and/or various chemical solvents at elevated temperatures of approximately 200° F. and up.

In a hot wash phase, the oscillatory drum action at suitable speeds results in violent washing action and the hot washing liquor is effective in removing much of the remaining residue and contaminants from the surface of the plastic chips. The removal takes place more or less continuously during the phase of treatment. The hot washing liquor and contaminants contained therein may be continuously removed from the drum section or is removed at the end of the phase and the charge of plastic chips are then passed into the next section or compartment of the drum for a next phase of treatment. Washing action may take place in one, two or more succeeding cells or chambers of the drum with a continuous flow through of wash media to remove contaminants from the charges of plastic chips on a continuous basis.

In the following sections or phases of treatment in successive drum cells, a chemical scrubbing solvent or washing liquor, either hot or cold may be used, containing a suitable formulation of chemical agents and/or solvents. When these phases are completed and most of the scrubbing liquor has been removed from the chips, the chips enter a rinsing phase or phases utilizing hot or cold clear water or water having an additive in order to finally rinse any remaining chemical solvents or washing liquor that may remain in the chips. The rinse phase or process may be completed in one or more sequential drum sections and eventually the batch of chips are transferred into the last chamber in the drum ready for output as cleaned plastic material. Drying of the cleaned plastic chips leaving the drum may be accomplished in a hydrocyclone or other type of dryer and different types of separators may be utilized to separate portions of the materials having different characteristics such as density and size.

The cleaned, recycled plastic chips may then be used for a variety of different applications and molding processes and may be used in a blend along with other virgin plastic resins and suitable binders in various molding or extrusion processes as desired. As far as is known, there is no suitable unitary type of prior art system or apparatus or suitable method for carrying out the described cleaning process and selected phases as contemplated in the present invention.

Referring now more particularly to the drawings, in FIGS. 1-5 is illustrated and new and improved unitary apparatus for recycling used, contaminated material such as plastic chips contained in collected waste material as previously described. The apparatus is also illustrated in diagrammatic form in FIGS. 6A, 7 and 8C and is referred to generally by the reference numeral 20. The apparatus 20 includes an elongated, cylindrical vessel or drum 22 formed of steel or stainless steel plate rolled to provide a circular cross-section as best illustrated in FIGS. 3A-3D. The rotating drum 22 is supported for rotation about a generally horizontally extending axis from a base structure 24 having longitudinally extending side channels 26 interconnected at appropriate intervals by transverse cross members 28.

At appropriate intervals along the length of the base 24 there are provided upstanding posts 30 connected at their upper ends to longitudinally extending upper frame channels 32 disposed on opposite sides of the drum 22 as best shown in FIGS. 3A-3D. A plurality of intermediate level transverse support beams 36 are provided to extend between the support posts 30 so that the rotating drum 22 is supported at a level in an upper portion of the framework as shown in FIGS. 3A-3D for rotation about a longitudinal horizontal axis 38 spaced midway between opposite side frame structure posts 30 on the base 24.

At opposite end quarter points along the length of the drum 22 there is provided a pair of relatively heavy tires or ring tracks 40 secured to the outside surface of the drum shell and, in turn, supported on a pair of trunion wheels 42 on opposite sides of the centerline of the drum as best shown in FIGS. 3A-3D. Each trunion wheel 42 is mounted on an axle 44 journalled in a pillow block bearing unit 46 at opposite ends of the shaft or axle. The pillow blocks 46, in turn, are mounted on angularly sloping base plates 48 secured to extend upwardly from the intermediate level cross beams 36 and joined to a respective vertical support post 30 at the upper end. Triangular-shaped gusset plates 49 are provided for added stiffness and support for the pillow block bearings 46.

Figure 5:
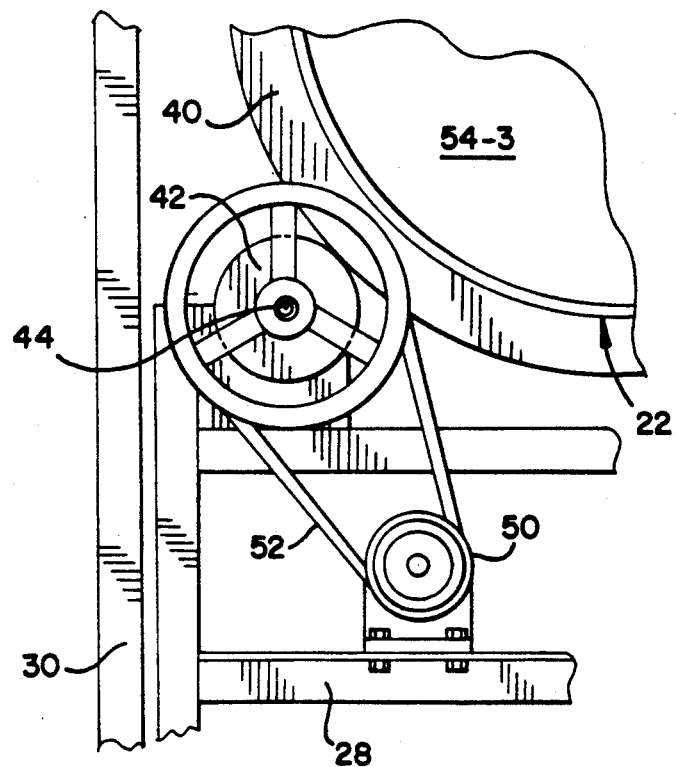
FIG. 5 is a fragmentary transverse cross-sectional view illustrating one type of vessel support and a typical type of drive unit suitable for the rotating vessel.

A suitable motive power unit such as an electric motor or hydraulic drive motor 50 is provided for turning at least one of the trunion wheels 42 in order to rotate the elongated drum 22. A hydraulic drive motor 50 provides a low RPM, high torque, easily reversible source of rotative power which may be suitably coupled to the support axle 44 of one or more of the trunion wheels 42 through a gear train system and/or reduction belt or chain drive assembly 52 as shown in FIG. 5. As previously indicated, the drum 22 is driven in oscillatory rotational fashion about the longitudinal axis 38 at a speed range of 10 to 20 RPM and after each phase or cycle of operation in an oscillatory fashion of predetermined time length, the drum 22 is then rotated a full 360° turn in one direction as indicated by the arrow "A" in FIG. 3B, causing the materials in the drum to advance longitudinally from compartment to compartment and the materials in the last section or chamber of the drum 22 are discharged out of the end of the drum.

Figure 2:
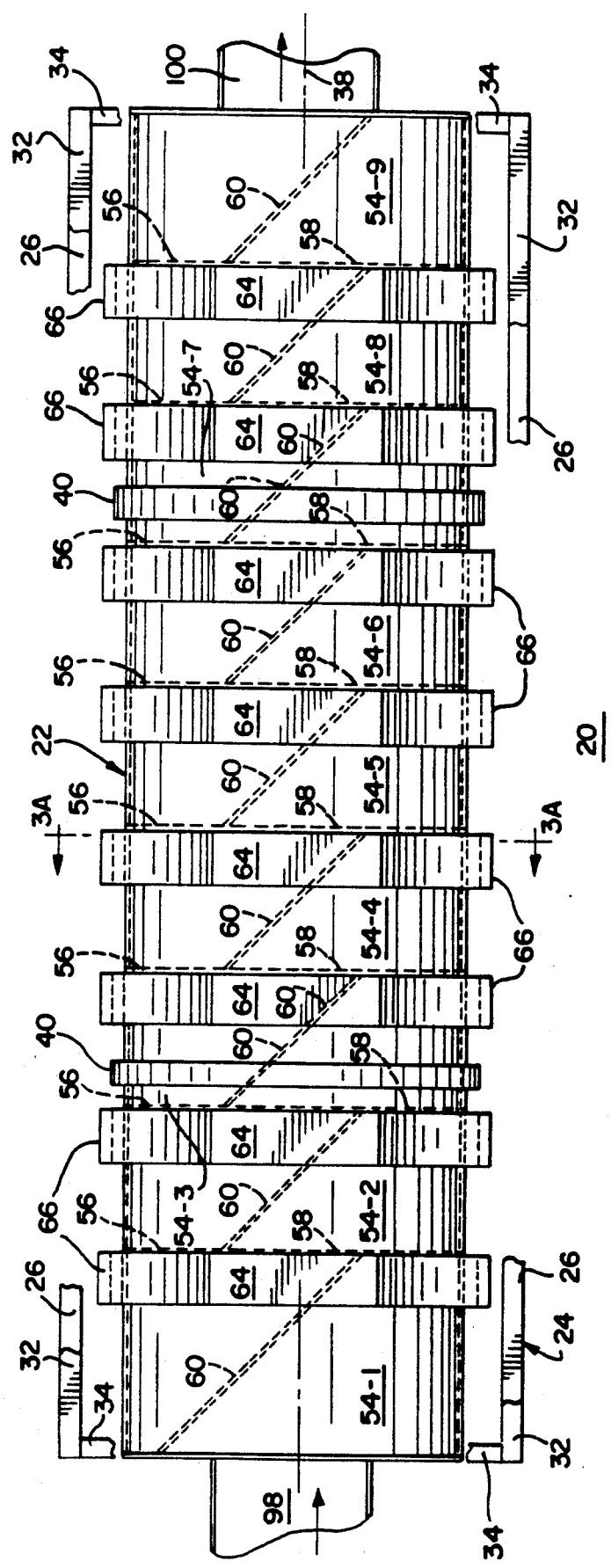
FIG. 2 is a top plan view of the apparatus.
Figure 6A:
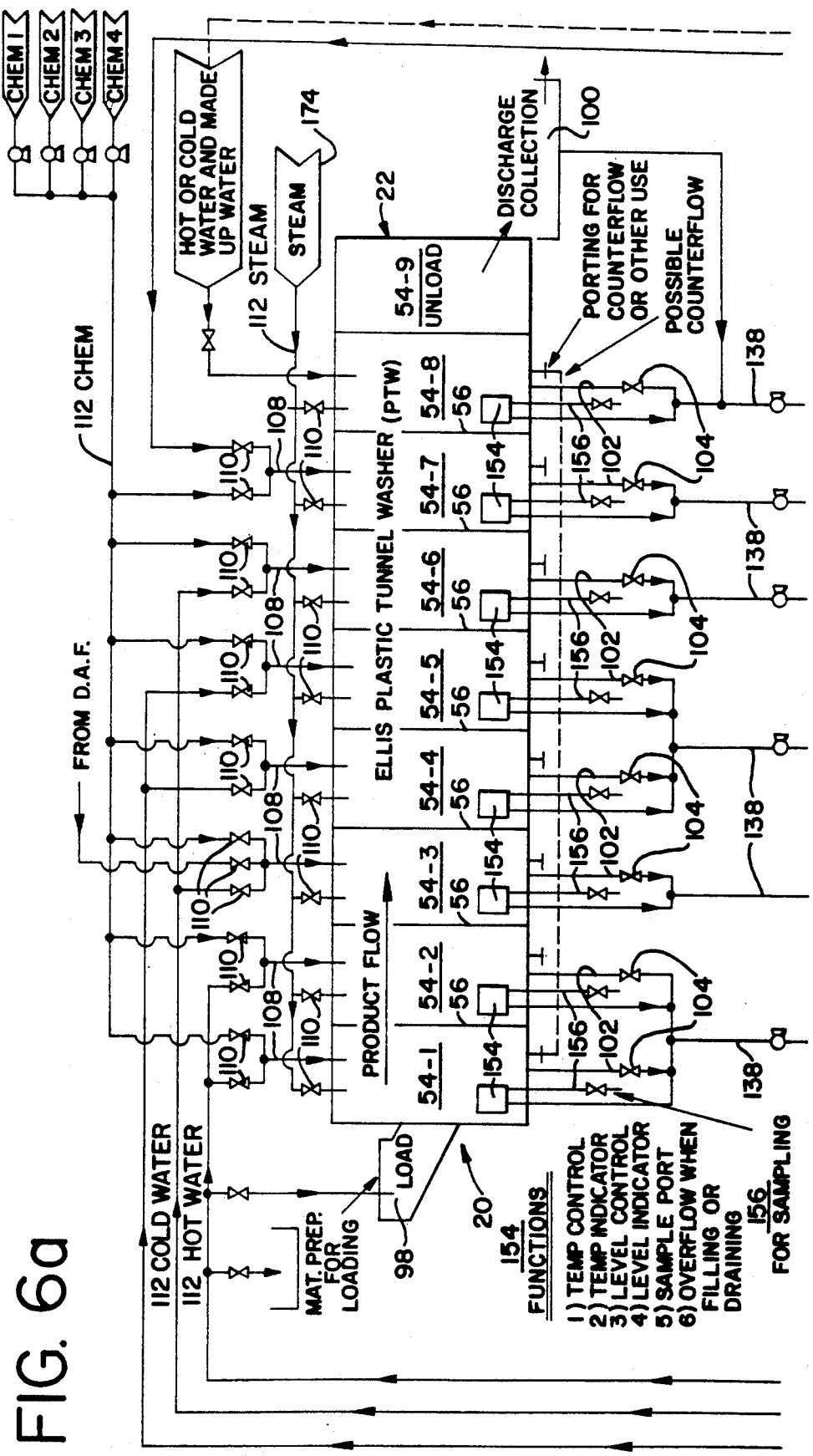
FIGS. 6A and 6B comprise a piping diagram showing fluid piping utilized with the unitary apparatus and the various sections or compartments in the unitary drum or vessel.
Figure 7:
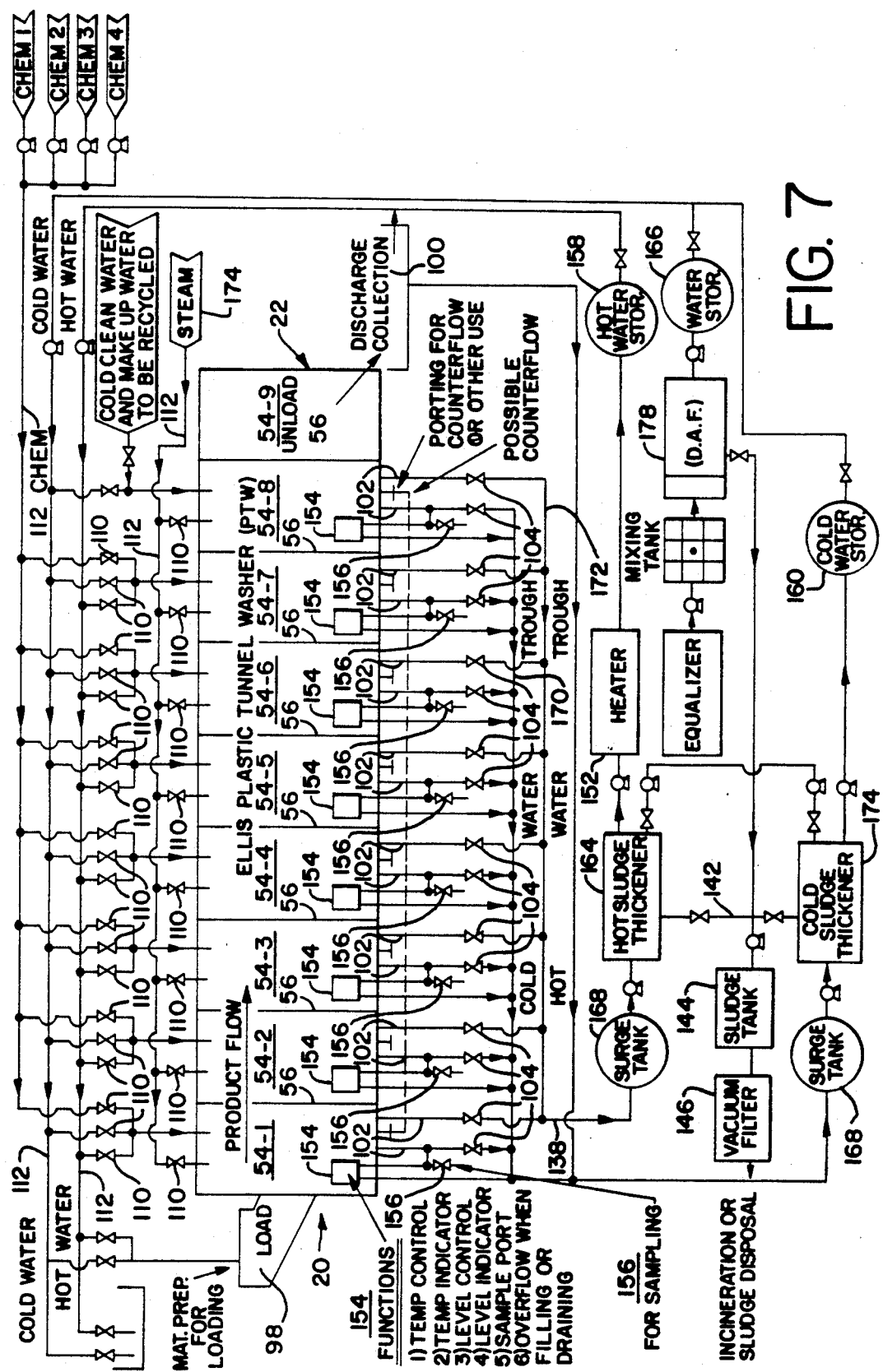
FIG. 7 is a diagrammatic view similar to FIGS. 6A and 6B but illustrating additional associated equipment used in the system.

In accordance with the present invention, the elongated, horizontal, cylindrical drum 22 is divided into a plurality of compartments or chambers, such as the cells 54-1, -2, -3, -4, -5, -6, -7, -8, etc., and a final unloading compartment 54-9 as indicated in FIGS. 2, 6A and 7. Except for the inlet compartment 54-1 and the outlet or unloading compartment 54-9, the remaining chambers or compartments 54-2 through 54-8 are substantially equal in size and capacity and each compartment is separated from a next succeeding compartment by means of a radial divider wall 56 of circular outline as shown in FIGS. 3A-3D.

Each circular divider wall 56 is formed with an enlarged transfer opening 58 having an area of approximately one-quarter of the total area of the circular wall and positioned in an upper half of the wall when the drum 22 is in a neutral rotational position as shown in FIG. 3A.

Each transfer opening 58 is associated with a transfer flight or baffle 60 joined along one edge thereof for advancing or pushing forward the contents of one compartment and moving the charge of material through the associated opening 58 into the next compartment upon a complete 360° turn or revolution of the drum 22 in one direction as illustrated by the arrow "A" in FIG. 3D.

As shown in FIG. 2, the transfer baffles 60 are arranged at approximately a 45° angle relative to the longitudinal axis 38 of the drum 22 and each baffle 60 includes a trailing edge joined to one edge of a preceding divider wall 56 and a leading edge joined to an opposite edge of an opening 58 in the next successive divider wall 56. In general, the leading and trailing edges of each baffle 60 are aligned with opposite edges of the respective transfer openings 68 and the baffles 60 thus form a transfer chute for moving a charge of materials contained in one compartment or chamber into the next compartment or chamber when a complete 360° revolution is accomplished as indicated by the arrow "A" in FIG. 3D.

As indicated in FIGS. 3A-3C, each separate compartment 54-1 through 54-8 in the elongated drum 22 is adapted to contain and hold a quantity of liquid media having an upper level 62, movably spaced somewhat below the center axis 38 of the drum. The transfer openings 58 and sized to have a width dimension such that when the drum 22 is oscillated from a neutral position of FIG. 3A in a clockwise direction to a limit position in one direction as shown in FIG. 3B, the upper level 62 of the liquid medium is slightly below the adjacent side edge of the transfer opening 58. Similarly, when the drum 22 is oscillated in a reverse direction to a limit position, as indicated by the arrow "C" in FIG. 3C, again an adjacent lower side edge of the transfer openings 58 is spaced somewhat above the upper level 62 of the liquid medium contained in the compartments. The transfer openings 58 on each compartment divider wall 56 are in coaxial alignment along the length of the drum 22.

In accordance with the present invention, between each of the successive cells or compartments 54-1 through 54-8, there is provided an upstanding hollow shroud structure 64 of generally octagonal shape and transverse cross-section as shown in FIGS. 3A-3D. Each shroud 64 includes a peripheral outer wall 66 joined at opposite edges with a pair of spaced apart parallel transverse end walls 68. The end walls 68 have an enlarged circular opening 69 at the center with a diameter slightly greater than the outer diameter of the drum 22. The drum 22 extends through the openings 69 and is rotational in respect thereto as best shown in FIG. 4.

Each shroud or housing 64 is provided with a pair of circular, resilient seals 70 which form a liquid tight seal around the exterior surface of the drum 22 and the interior of the shroud housing 64. As shown in FIG. 4, the seals 70 are formed of resilient material and include outwardly extending lips 72 for engagement with the inside surface of the shroud end walls 68 outwardly of the circular opening 69. The material of each seal 70 is especially formulated or compounded for the wash media involved and each seal 70 is secured to the exterior surface of the drum 22 by a clamping ring 74 which is tightened around the drum and presses an inner leg 76 of the seal 70 against the exterior surface of the drum 22.

Figure 4:
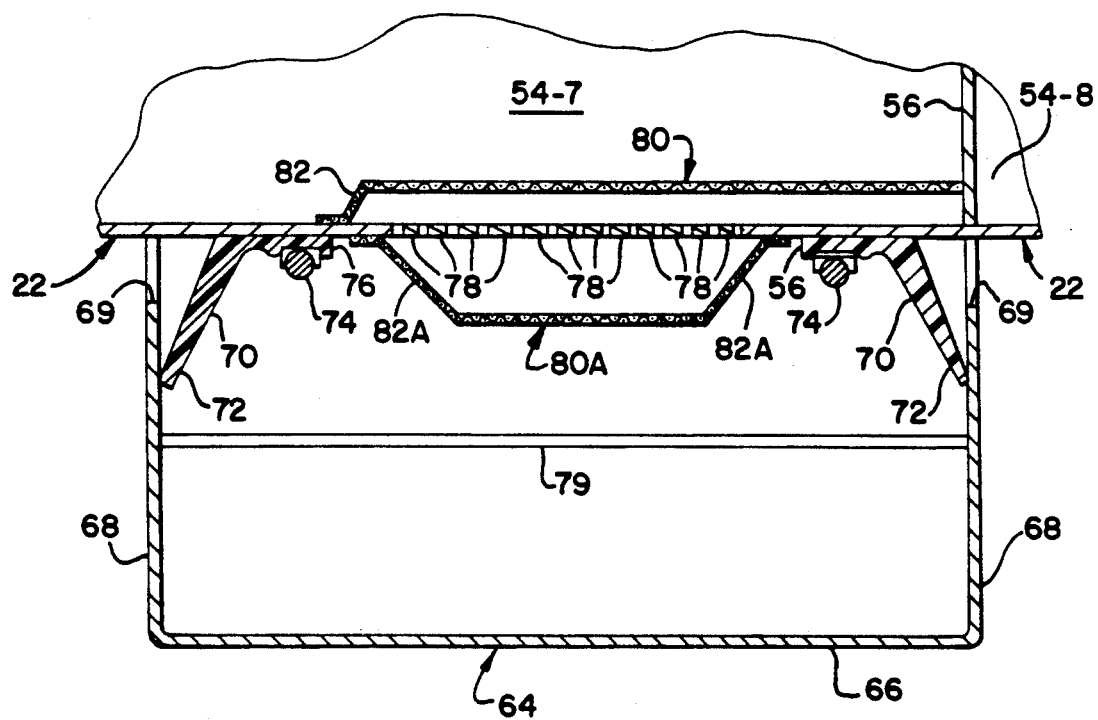
FIG. 4 is a fragmentary cross-sectional view taken substantially along lines 4—4 of FIG. 1.

As illustrated in FIGS. 1-4, a shroud or housing 64 is provided closely adjacent to each of the circular divider walls 56 and as shown in FIG. 4, a portion of the exterior wall of the drum 22 is formed with a ring segment of perforations 78 in order to accommodate the rapid transfer of liquid or fluid media into and out of a respective drum compartment 54-1 through 54-8.

Each shroud or housing 64 is provided with a plurality of circumferentially spaced stiffener bars 79 forming a segmented ring around the drum 22 and extending between inside opposite faces of the drum end walls 68. The stiffener bars 79 help maintain good sealing contact between the inside surfaces of the end walls 68 and the lips 72 of the seals 70 bearing against these surfaces so that liquid leakage does not occur.

In accordance with the present invention, each of the compartments 54-1 through 54-8 is provided with an arcuate screen 80 having a screen mesh of a size small enough to preclude passage of plastic chips through the screen and large enough to permit rapid flow of liquid media and contaminants into and out of a drum compartment. As illustrated in FIGS. 3A-3D, the inside or internal screen 80 extends around the a circumferential surface segment of the drum 22 for approximately 270° and stops short at upper ends of the transfer opening 58.

Instead of an internally mounted screen 80, each shroud 64 may be provided with an external screen 80A.

The screens 80 or 80A may be replaced from time to time and each may include an edge bearing against the surface of the adjacent divider wall 56 and includes an edge or lip 82 or 82A bearing against the inside or outside surface of the drum 22. Outside mounted screens 80A may be more easily cleaned and/or replaced.

Each drum compartment 54-1 through 54-8, etc., may be provided with a plurality of longitudinally extending agitator ribs or baffles 84 having a triangular-shaped transverse cross-section and spaced circumferentially apart on the inside surface as shown in FIGS. 1-3D. The agitator ribs 84 move the materials inwardly away from the outer periphery of the rotating drum 22. As the drum 22 oscillates back and forth, the surfaces of the triangular flights 84 push and move the plastic chips through the liquid medium contained in the respective compartments to provide internal washing action for removing material from the surfaces of the chips. The ribs 84 are located in approximately three-quarters or 270° of the circumference of the drum 22 and are discontinued adjacent the discharge openings 58. Moreover, as shown in FIG. 1, the ribs or baffles 84 extend in a direction generally parallel of the longitudinal axis 38 of the rotating drum 22.

In accordance with the present invention, each of the compartments 54-1 through 54-8 is provided with a plurality of radially disposed agitator or basher bars 90 which as shown in FIGS. 3A-3D are located on radials extending outwardly from the central axis of rotation 38. Spacing of the individual basher bars 90 outwardly from the axis of rotation is varied as illustrated so that essentially the entire volume depth of liquid media and plastic chips contained in a compartment between the center axis of rotation and the outer periphery of the drum 22 will be subjected to the internal churning action of the basher bars 90 as oscillation of the drum in opposite reversible directions takes place during a phase or cycle of operation.

The basher bars 90 extend between adjacent divider walls 56 and each compartment or drum section 54-1 through 54-8, etc., and are especially designed to engage the floating or lighter weight plastic chips adjacent the upper surface 62 of the liquid media in a compartment to forcefully move the plastic chips downwardly, and through the liquid media to wash contaminant materials away from the surface of the chips for eventual collection in the shroud 64 when the drainage of liquid media occurs. In general, the basher bars 90 are formed of metal plates or bars and have a relatively wide dimension radially of the axis of rotation 88 so that a large mass of accumulated, floating type plastic chips adjacent the upper level 62 in the liquid media is engaged and moved as the oscillation of the drum 22 takes place for a selected time interval.

Figure 12:
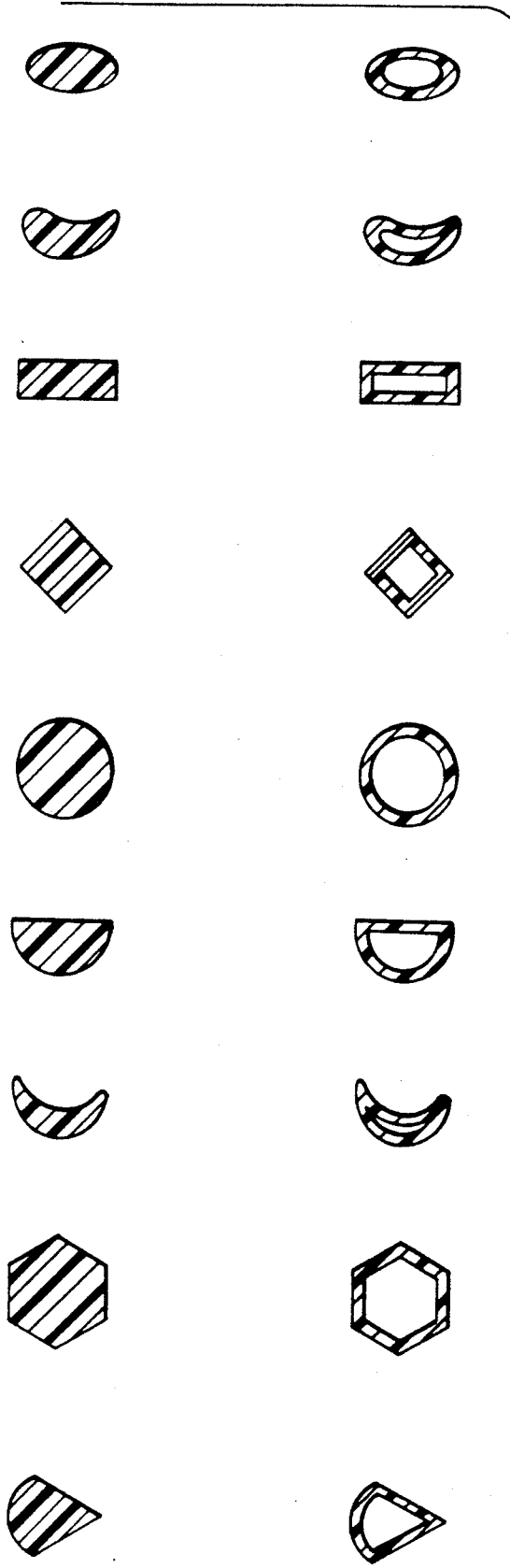
FIG. 12 is a diagrammatic view of suitable cross-sectional shapes of agitating elements that may be utilized in accordance with the present invention for cleaning plastic chips in the apparatus.

Referring to FIG. 12, the basher bars 90 may have a wide variety of cross-section shapes and may have surfaces formed of resilient material, abrasive material, or they may have a tubular or hollow cross-section to reduce weight.

Figure 10:
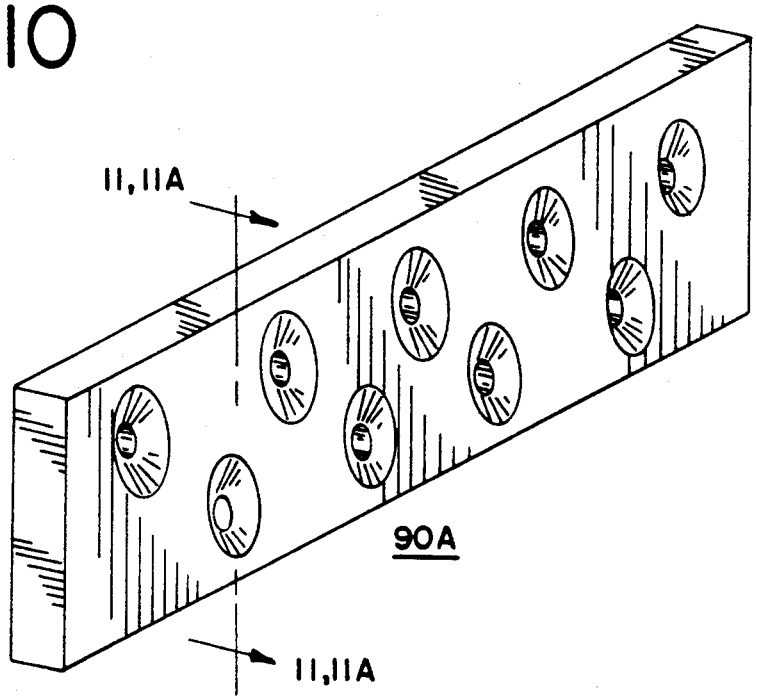
FIG. 10 is a perspective view of a modified form of radial elements used for engaging floatable plastic chips in a liquid medium within a rotating drum.
Figure 11:
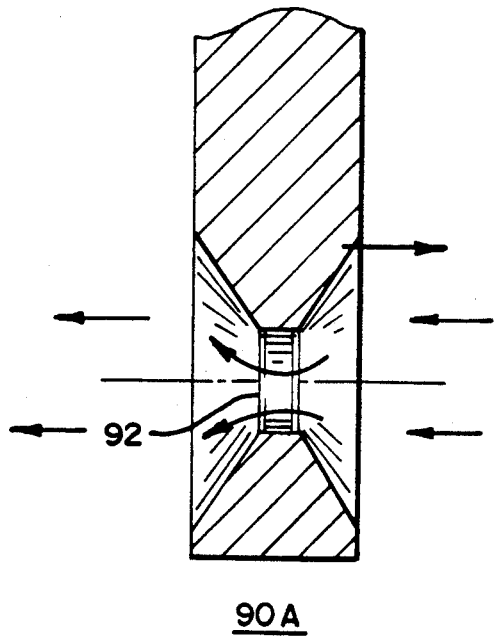
FIG. 11 is a transverse cross-section taken substantially along lines 11—11 of FIG. 10.
Figure 11A:
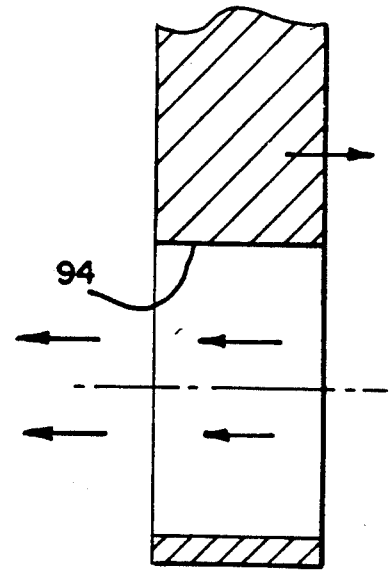
FIG. 11A is a transverse cross-sectional view taken along lines 11A—11A of FIG. 10 showing an alternate embodiment of an agitating element.

In general, the basher bars 90 provide a flat or curved surface or shape to engage an area or region of floating or submersed plastic chips as the oscillating action takes place. As shown in FIGS. 10, 11 and 11A, various forms of flat basher bars can be provided. The basher bar 90A of FIGS. 10 and 11 is formed with parallel flat faces having a plurality of conical openings or ports 92 distributed over the face area of the bars. As these basher bars 90 move through the wash liquid, the relative velocity of the fluid through the ports 92 is greatly increased and more intense washing action may be achieved during oscillation movement. Where increased velocity is not as important, a basher bar 90B (FIG. 11A) may be provided with a straight cylindrical port 94 of relatively uniform and large diameter.

It is also useful to provide additional cross-sectional shapes of basher bars 90 such as those shown in FIG. 12 and these bars may have various types of coating materials on the outer surface such as plastic or resilient material to avoid grinding, chopping or abrasive action which results in reducing the size of plastic chips and the like which are sometimes of a relatively brittle material with little bending strength.

In accordance with the present invention, various types of fluid including hot water, cold water, steam, chemicals and other fluids may be introduced into selected ones of the individual compartments 54-1 through 54-8 via fluid input conduits 106 (FIGS. 3A-3D) connected to the shroud 64 at upper levels. Fluid entering the upper level portions of a shroud housing 64 is controlled to provide a selected volume or level of fluid in the adjacent drum compartment 54-1 through 54-8 and passes into the compartment through the ring containing plurality of perforations 78 and/or screen 80 or 80A of the respective compartment until the desired upper liquid medium level 62 is attained as illustrated in FIGS. 3A, 3B and 3C. Fluid entry may be continuous or intermittent depending on the volume and flow in the rate required.

The charge volume or quantity of plastic chips contained in each compartment is, of course, regulated by the volume or size of each initial or new charge of plastic chip material introduced into the loading compartment 54-1 through an inlet chute 98 Consequently, at an outlet end of the drum 22, charges of cleaned plastic chips are discharged into a collecting outlet chute 100 at successive discharge internals.

It will thus be seen that when the drum 22 is fully loaded, equal size charges of plastic chips to be cleaned are present in each of the separate drum cells or compartments 54-1 through 54-9 and as each new charge of plastic chip material is added into the first compartment 54-1 through the inlet chute 98 a finished clean charge of material is discharged or unloaded from the last outlet compartment 54-9 into a discharge collection chute or hopper 100.

In order to aid in the rapid draining or discharging of fluid from each of the respective compartments 54-1 through 54-8, each of the shroud housings 64 is provided with one or more relatively large size outlet or drain conduits 102 on the lower level so that at the end of an operating, oscillatory cycle, the fluid may be rapidly drained and the contaminants contained in the fluid subsequently removed. Control valves 104 are provided for each drain outlet 102 and similarly, fluid input control valves 110 are provided for each of the fluid inlet conduits 106 for supplying fresh or recycled liquid medium to the drum compartments. Additional or make-up fluids may be supplied to the respective drum compartments or chambers 54-1 through 54-8 from upper portions of the respective shroud housings 64 through the variety of fluid inlet fittings 106 and even more inlet fittings 108 may be provided on vertical side walls of the shrouds if needed. Control valves 110 and headers 112 are provided as necessary to supply the fluids to the upper levels of the shrouds as shown in FIGS. 3A-3D. Each shroud 64 may also be supplied with fluid medium at a low level via inlet fittings 96 supplied from low level headers 97.

Figure 9:
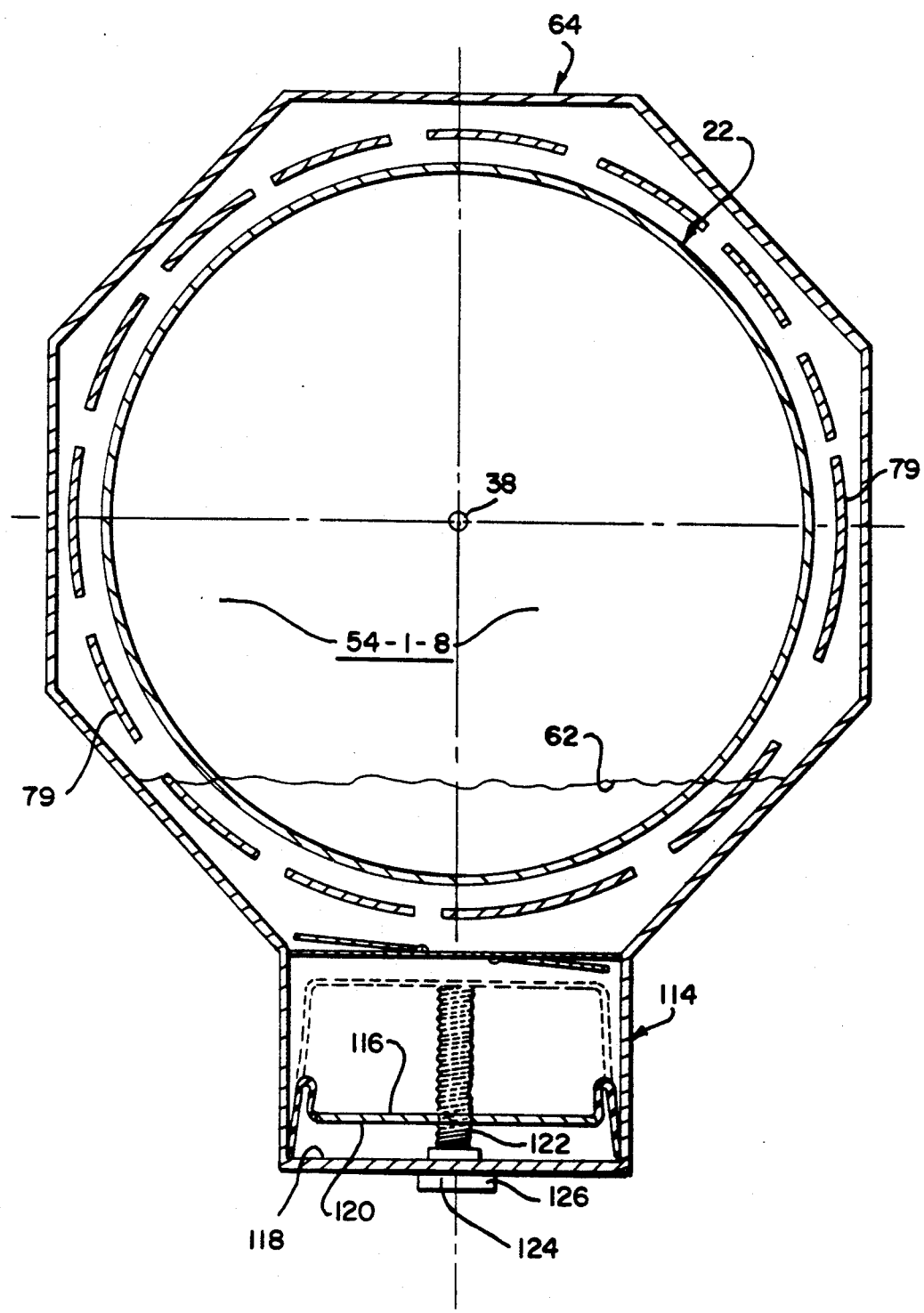
FIG. 9 is a transverse cross-sectional view similar to FIG. 3A of an alternate embodiment of the invention including a system for controlling the level of wash media.
Figure 9A:
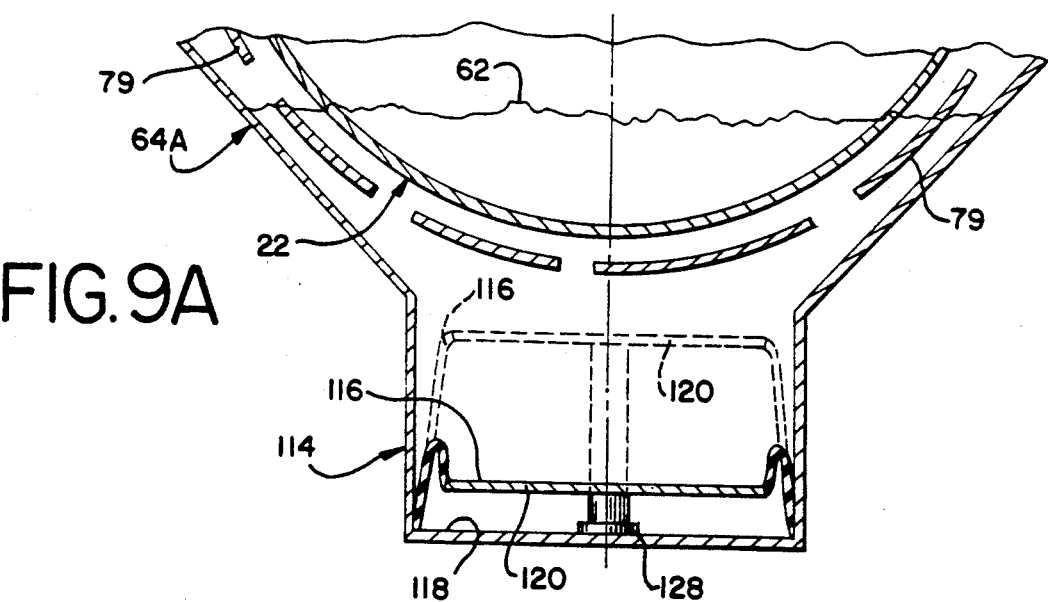
FIGS. 9A, 9B and 9C are fragmentary cross-sectional views similar to FIG. 9 illustrating alternate types of mechanisms for controlling a bladder for effecting the level of liquid medium.
Figure 9B:
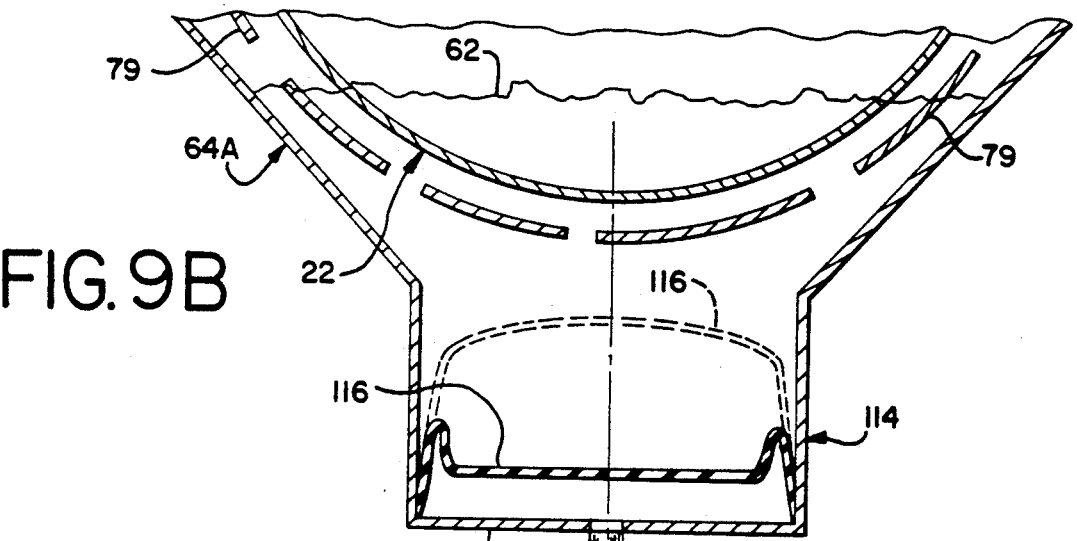
Figure 9C:
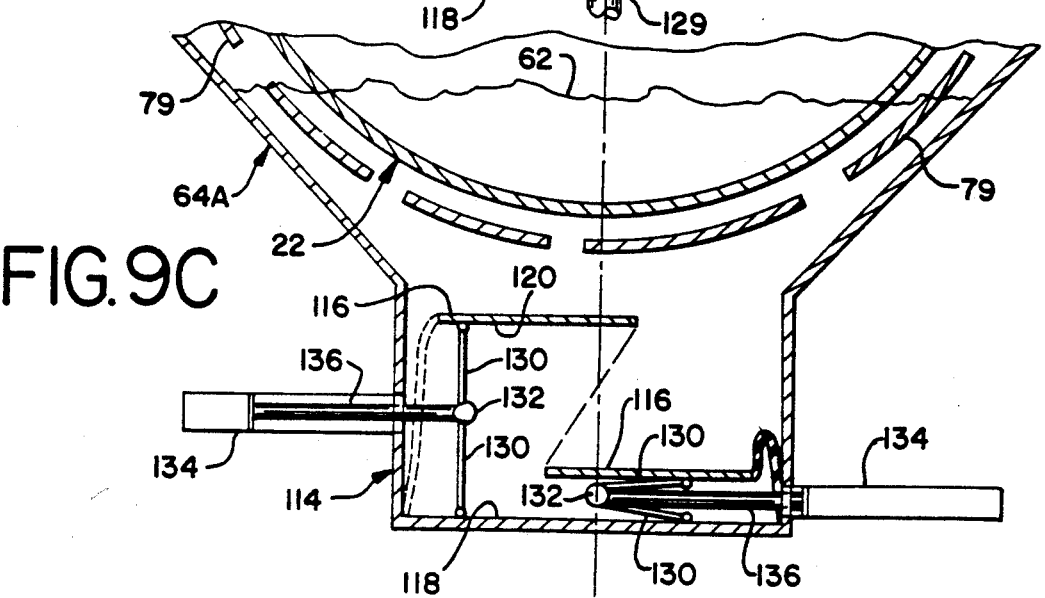

Referring now to FIGS. 9 through 9C, in some cleaning operations it may not be necessary or required to load and then completely remove or drain the entire quantity of liquid medium for each new charge of plastic chip materials introduced during each operational cycle. In this case, a modified form of shroud mechanism 64A is provided having a lower sump 114, of a generally cylindrical shape for holding an adjustable quantity of liquid medium while the plastic chips in the compartments 54-1 through 54-8 are being transferred into the next adjacent compartment by a complete revolution of the drum 22 as previously described. As illustrated in FIG. 9, the liquid wash media during the washing process has an upper level indicated by the number 62, which level is spaced below the horizontal axis of rotation 38 but which level provides a sufficient volume of liquid media to wet and collect contaminants from the charge of plastic chips contained in the respective compartments 54-1 through 54-8.

The volume of liquid medium that may be contained in the sump 114 of the modified shrouds 64A may be selectively controlled to provide the desired amount of liquid as needed and for this purpose, the sump 114 is provided with a bladder 116 formed of tough, durable flexible material. With a cylindrical-shaped sump 114, the bladder 116 includes a circular upper wall and a flexible cylindrical side wall secured around a lower peripheral edge to the inside surface of the cylindrical sump 114 adjacent the level of a lower end wall 118 of the sump.

In the embodiment shown in FIG. 9, the circular upper wall of the bladder 116 is provided with a circular-shaped stiffening disk 120 formed of a rigid plate and the disk is movable upwardly and downwardly within the sump 114 to change the volume of liquid contained by means of a vertical jack screw 122 extending upwardly and secured at the upper end to the center of the stiffening plate 116. The jack screw 122 is threadedly engaged within a nut or collar 124 mounted on the lower end wall 118 of the sump 114 and a rotating drive mechanism 126 is provided to turn the jack screw and move the bladder 116 up and down as desired. The driver 126 may comprise an electric or hydraulic motor and a precise volume of the sump 114 can thus be controlled to adjust the upper level 62 of liquid in the compartment as desired. Sumps 114 of square, rectangular or other geometric shapes may be provided and in this case the associated bladder 116 is of a similar configuration. The bladder 116 can function as a speedy means for removing liquid media from the compartments 54-1 through 54-8.

Referring to FIG. 9A, therein is illustrated another embodiment of the invention wherein an air or hydraulic cylinder 128 mounted on the lower end wall 118 of the sump 114 is provided to raise and lower the circular stiffening plate 120 to rapidly expand and/or contract the bladder 116 and thereby change the volume of liquid contained in the sump 114 Referring to FIG. 9B, therein is illustrated yet another embodiment of the invention where the flexible bladder 116 is raised and lowered by means of the amount of compressed air or other fluid introduced into or discharged from the area above the sump end wall 118 below the bladder 116 through a fluid inlet fitting 129 at the center of the bottom wall 118.

In FIG. 9C is illustrated yet another embodiment of the invention wherein the elevation of a bladder stiffening plate 120 is controlled by means of a plurality of pairs of pivotally interconnected arms 130 having opposite outer ends pivotally connected to the stiffening plate 120 on the one hand and the sump bottom wall 118 on the other hand. Each set of upper and lower arms 130 are pivotally interconnected at a pivot point 132 to provide a toggle mechanism for raising and lowering the stiffening plate 120 and thus controlling the volume of the liquid medium contained in the sump. Each toggle mechanism is controlled by a fluid cylinder 134 mounted on the outer surface of the side wall of the sump 114 for vertical movement up and down as a piston rod 136 is moved inwardly or outwardly as illustrated.

In many instances, it is desirable to move a liquid media into and out of a drum compartment with relatively fast movement which is not afforded by means of relatively small fluid outlets and the variable volume drum 114 and flexible bladder 116 can be utilized for this purpose. The speed or velocity of movement of the bladder 116 may be controlled for variable rate ramp-up and ramp-down or a constant velocity of movement thereby controlling the flow rate of liquid media into and out of a lower end of a drum compartment. Stored or temporarily retained liquid media may be transferred thereinafter away from the drum or may be reintroduced into a new charge of chips entering a drum compartment from a preceding drum compartment.

Figure 6B:
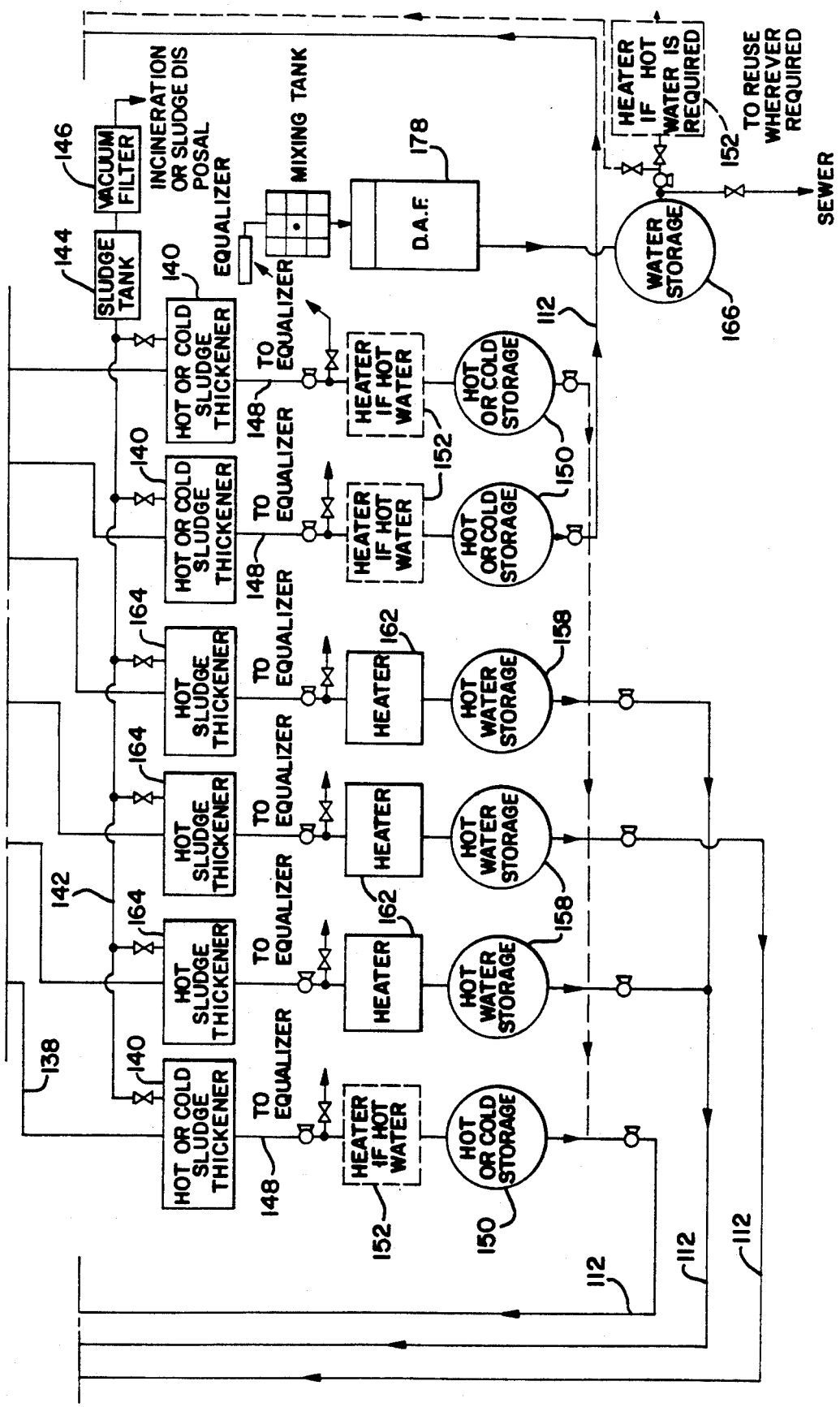

Referring now to FIGS. 6A, 6B and 7, therein is illustrated a fluid piping system utilized in accordance with the unitary apparatus for recycling plastic material 20 previously described herein. A supply of hot and cold water from headers 112 may be provided at the inlet end 98 for flushing new charges of plastic chip material into the first or prewash compartment 54-1. A measured volume or weight of plastic chip material to be treated is introduced into the first prewash or soak compartment 54-1 and hot or cold water is used for flushing the material into the inlet end of the drum through the loading chute 98. This flushing water speeds up loading time and may be provided in addition to a quantity of normal compartment fill water received from the hot and cold water manifolds 112 and supplied through the inlets 96, 106 and 108.

After each new charge of plastic chip material is introduced into the compartment 54-1, the drum 22 is agitated back and forth by rotation in opposite directions at approximately 10-20 RPM for a selected time interval. During this time, a high percentage of the contaminants on the surfaces of the plastic chips may be removed from the chip and collected in the wash or presoak liquids by the intense agitating action of the basher bars 90, 90A, 90B, etc., moving the plastic chip materials through the liquid medium in the respective compartments 54-1 through 54-8.

On a continuous basis during or near the end of an agitation cycle, the liquid medium, containing contaminants removed from the plastic chip material is drained through the screens 80 and/or 80A and perforation sections 78 of the drum sections into a shroud housing 64 as the valves 104 are open between adjacent compartments (54-1 and 54-2, for example) to permit this fluid to flow downwardly through a compartment drain conduit 138.

The contaminated liquid flowing from the drain line 138 is introduced into a hot or cold sludge thickener 140 (FIGS. 6B and 13) the sludge is thickened by the introduction of air bubbles via an air supply nozzle 139 or other source of air supply.

Figure 13:
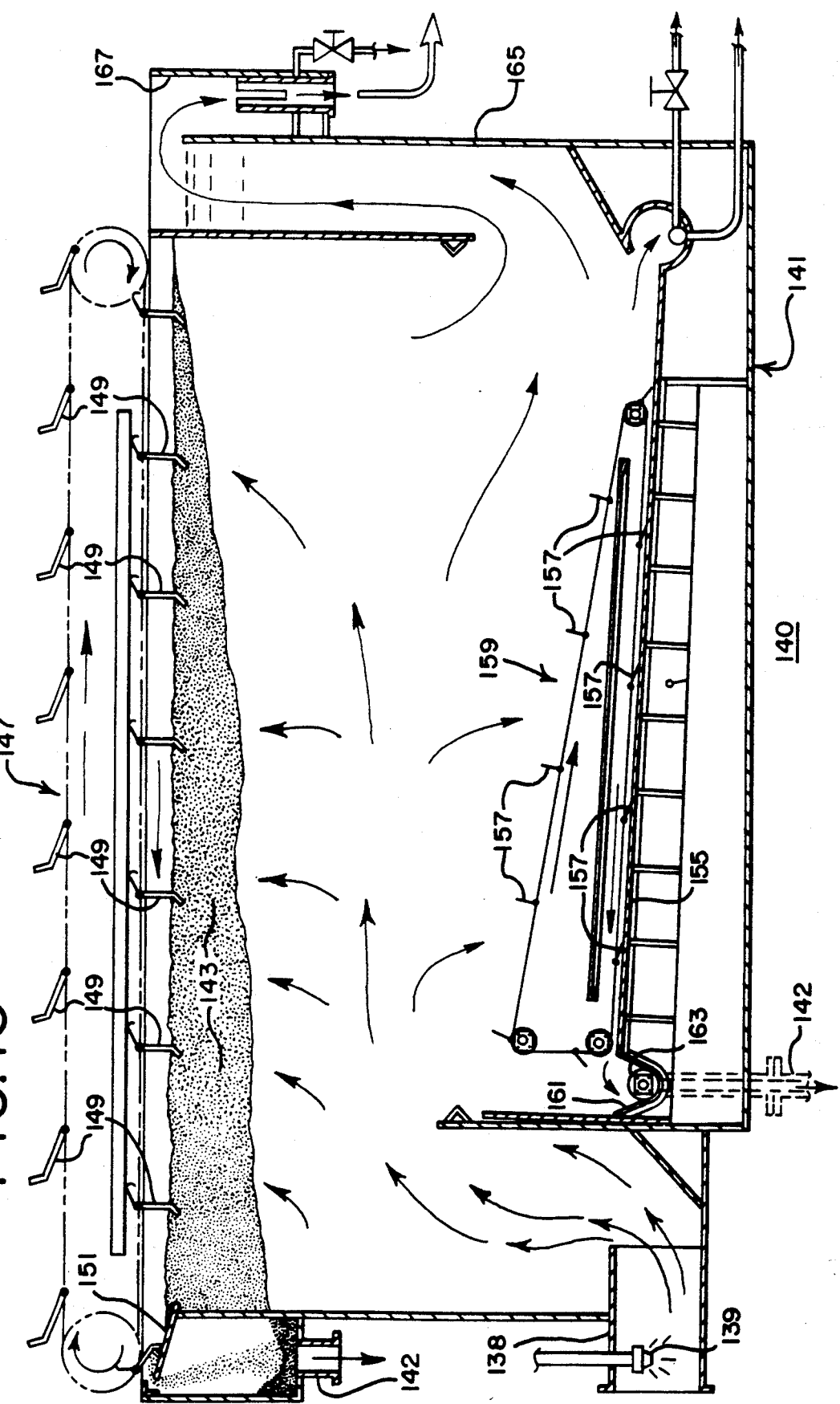
FIG. 13 is a cross-sectional view of a sludge thickener in accordance with the features of the present invention.

Referring now to FIG. 13, a sludge thickener 140 includes a holding tank 141 for receiving contaminated liquid medium from one or more compartment drain lines 138. The contaminated liquid medium is aerated from a source of compressed air connected to one or more air nozzles 139 so that a myriad of small air bubbles are formed in the liquid medium, which enters the tank at one end at a lower level.

Generally, contaminant materials in the liquid medium fall into three different categories, namely (1) lightweight or floatable contaminants, (2) contaminants that tend to remain suspended in the liquid medium, and (3) heavier weight contaminants that tend to settle downwardly. The air bubbles introduced into the liquid medium in the tank rises toward the upper level and the bubbles tend to cling to and gather up the suspended or middle weight contaminants which then tend to float upwardly to gather in a mass 143 with the floatable contaminants.

An endless belt type skimmer 147 having flights 149 is provided above the upper level of the liquid medium in the tank 141 and as the skimmer flights 149 move from right to left on a lower run (FIG. 13) the thickened contaminant material or sludge is swept over a sloped drain board 151 and eventually drops into a sludge outlet compartment 153 connected to a sludge drain line 142.

The heavier weight or settleable contaminants fall toward a sloped bottom wall 155 in the holding tank 141 and are moved toward an upper end of the bottom wall by a plurality of flights 157 on a lower run of an endless belt conveyor 159 positioned above the sloped bottom wall 155. Heavy weight contaminants reaching the left hand or elevated end (FIG. 13) of the wall 155 drop downwardly into a laterally extending discharge trough 161 having an auger 163 rotatable to move the sludge out of the holding tank 141 for discharge into another sludge line 142.

The thickened sludge removed from the liquid medium in the tank 141 and taken out via a common manifold line 142 passes into a surge tank 144 and vacuum filter 146 for eventual incineration or sludge disposal. Clean or recycled water from the hot or cold sludge thickener 140 passes over a dam or end wall 165 of the tank 141 and flows into a discharge weir 167 which is drained into a conduit 148 connected to a hot or cold water storage tank 150 wherein the cleaned liquid is stored until reused via one of the hot or cold water headers 112. Hot water may also be utilized in the first or presoak compartment 54-1 of the apparatus 20 and a heater 152 may be provided in the conduit 148 ahead of the storage vessel 150 when desired.

In each succeeding compartment or treatment chamber 54-2, 54-3, 54-4, 54-5, 54-6, 54-7 and 54-8 up until the final unloading compartment 54-9 is reached, the liquid medium provided for each charge of plastic chip materials contained in the compartments may include a variety of different chemicals which are supplied into the compartments through one or more chemical headers 112 supplied from a plurality of separate chemical sources 1, 2, 3 and 4.

Individual chemical control valves 110 may be provided for each drum compartment 54-1 through 54-8, etc., to supply a precise amount of chemical fluid for the cleaning process carried out in each of the respective treatment chambers. In each treatment chamber there is provided a sensor 154 for monitoring and/or controlling the functions of temperature control, temperature indication, level control, level indication, a sampling port and control valve and a monitor to detect overflow when filling or draining as shown in FIGS. 6A, 6B and 7. Outputs from the respective sensor elements 154 for each of the compartments are directed towards a central processing unit used for controlling the entire system 20.

The hot or cold water sludge thickeners 140 are adapted to precipitate out and collect the contaminant materials which have been collected in the respective drum compartments. After the contaminants sludge is removed in the sludge thickeners 140, the cleaned liquid medium is available for use and may move into a heating and/or storage tank system. The collected and dried out sludge is disposed of by incineration or other means but a much lower amount or volume flow rate after being dewatered or deliquified in the units 140. A supply of hot water may be provided from various hot water storage tanks 150, 158 which are fed with recycled or cleaned water from one or more hot sludge thickeners 140 and/or heaters 152. A plurality of hot water heaters 162 may be provided and cold water may be supplied from one or more cold water storage tanks 160.

Depending upon the cleaning process taking place in an individual compartment 54-1 through 54-8, a hot sludge thickener 164 may be provided to remove the contaminants and provide clear hot water for movement towards the heater or hot water storage facility. The removed sludge and contaminants are taken via conduits 142 to one or more sludge tanks or conditioners for incineration or other sludge disposal.

Cold sludge thickeners 140 can also be provided wherein low temperature water is utilized and after the sludge is removed in the thickening process, the recycled or clean water may be furnished and/or stored in one or more cold water storage tanks 160. In addition, a make-up supply storage tank 166 may be provided and surge tanks 168 may be utilized to accommodate the changes in flow rates of liquid discharged into cold water collection troughs 170 and hot water collection troughs 172 from the drum 22. The respective collection troughs are fed from discharge valves 104 on conduits 102 leading from the respective compartments 54-1 through 54-8 of the apparatus 20. The compartments along the drum 20 may also be provided with additional heat through means of a steam header 112 from an appropriate source of steam 174 when desired or required in a particular process.

Figure 8A:
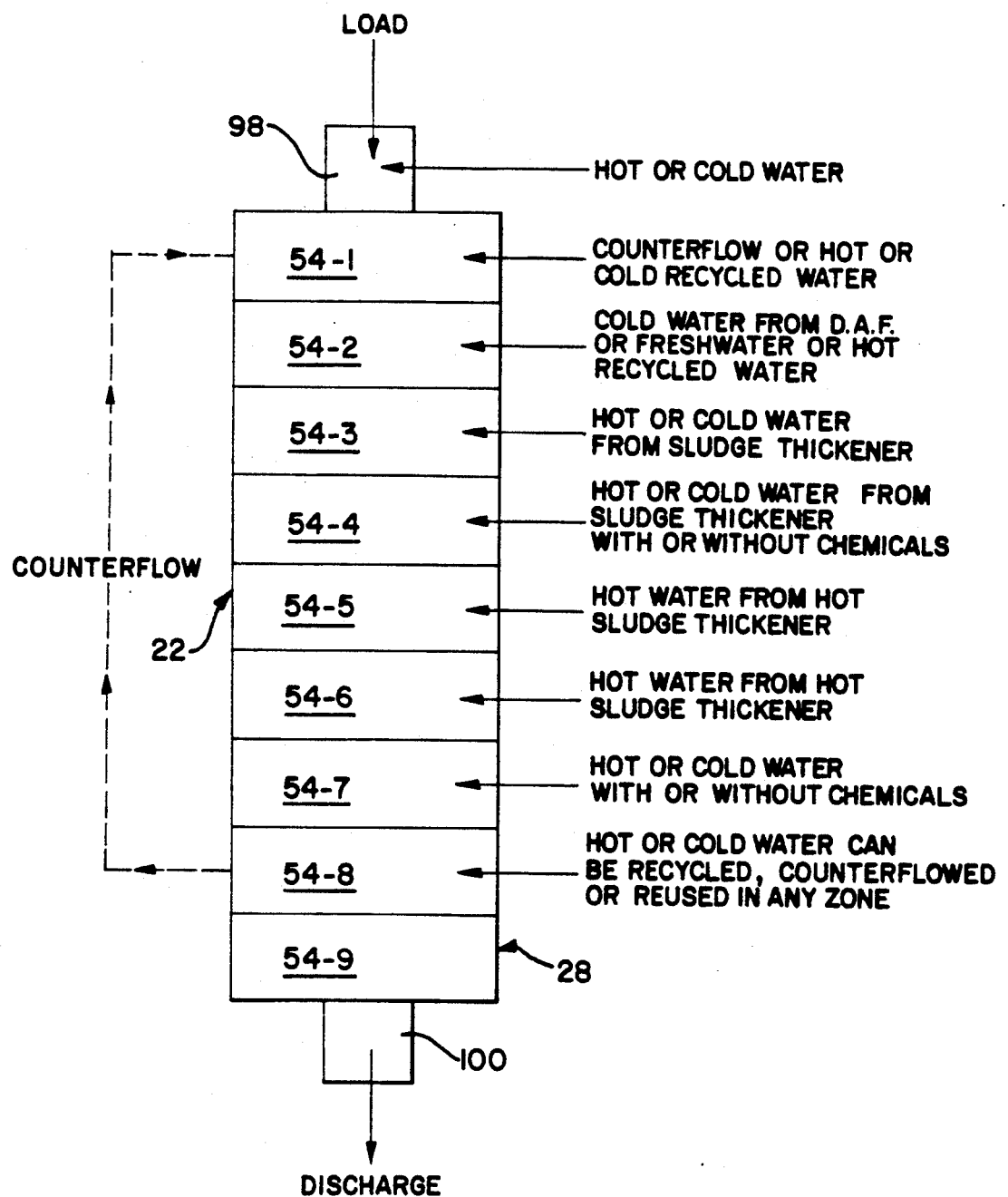
FIGS. 8A, 8B and 8C are diagrammatic views of a recycling facility utilizing apparatus constructed in accordance with the features of the present invention.
Figure 8B:
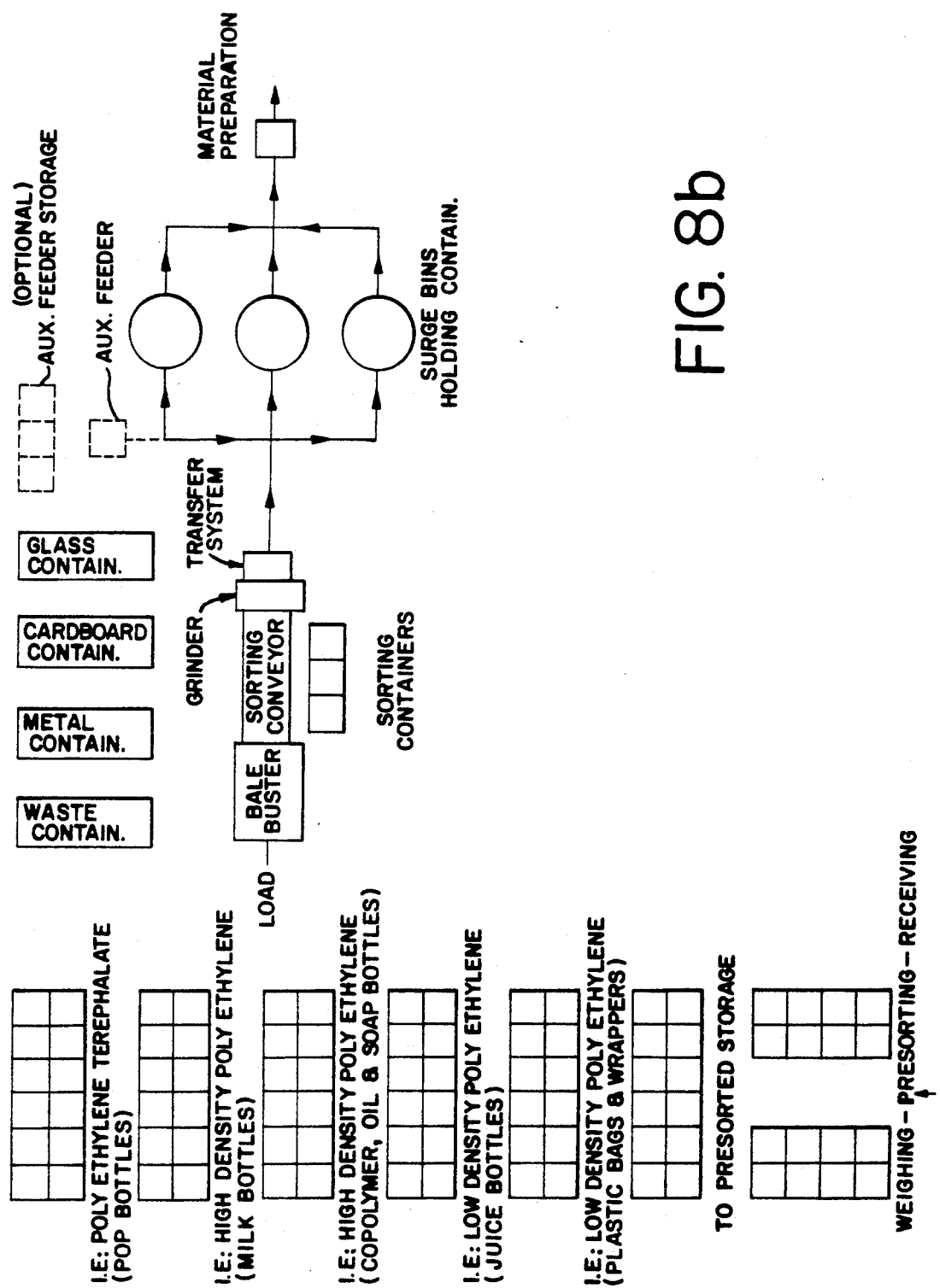
Figure 8C:
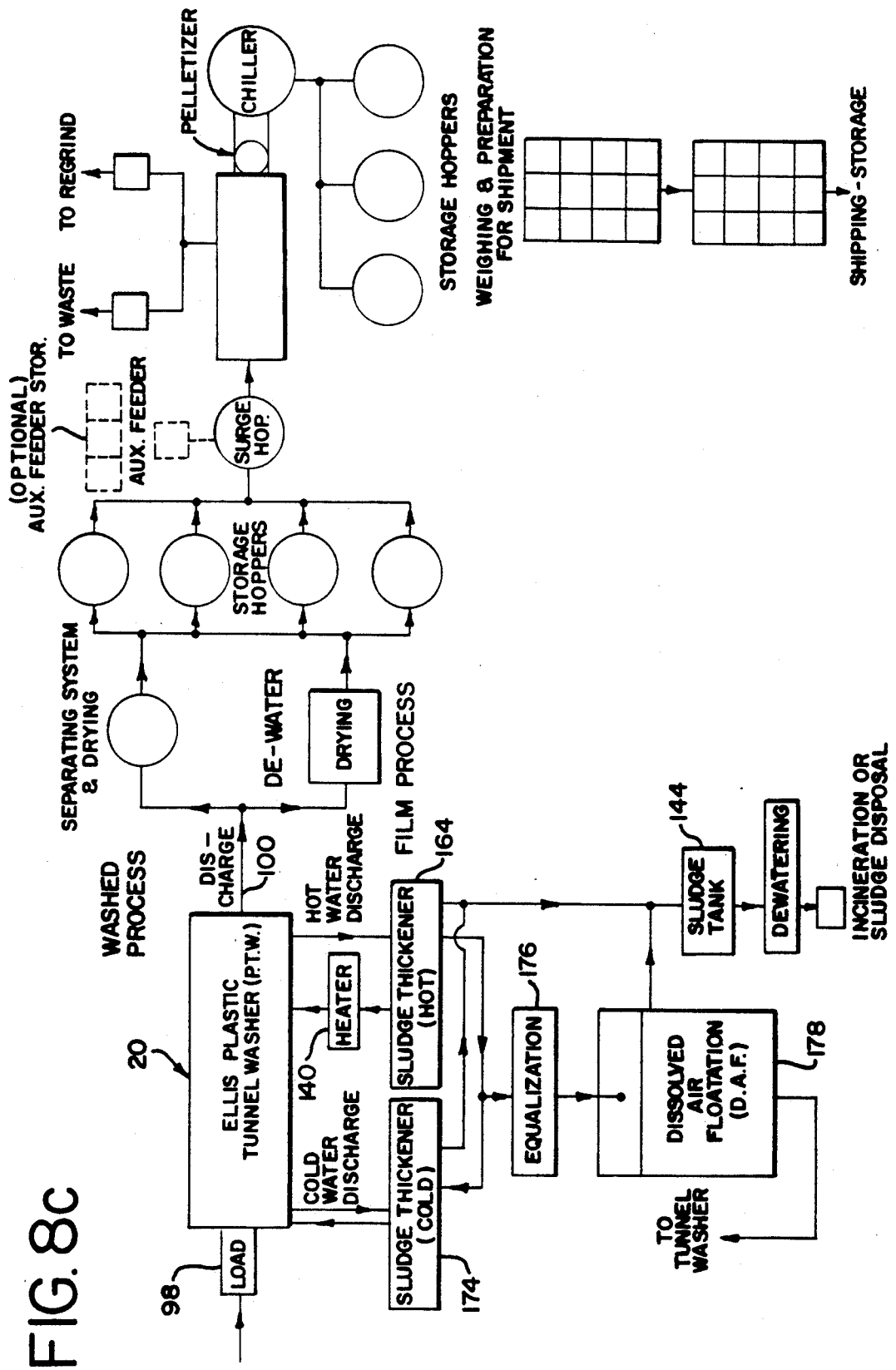

Referring specifically to FIGS. 8A, 8B and 8C, in FIG. 8A is illustrated a typical formulation for cleaning plastic chips wherein compartment 54-1 is utilized for a presoak treatment and hot and cold water is introduced along with counterflow hot or cold recycled water. In the next compartment 54-2, cold water from a dissolved air floatation recycling unit or fresh or hot recycled water is introduced along with detergents or chemical solvents in a wash cycle. In compartment 54-3, the liquid medium is made up from hot or cold water reclaimed from hot and cold sludge thickeners 140. Compartment 54-4 utilizes hot and cold water from hot and cold sludge thickeners 140 and chemicals from one of several sources 1, 2, 3 and 4 in a desired amount may be introduced to dissolve some of the contaminants present. Compartment 54-5 may provide yet another cell wherein a small amount of remaining contaminant material on the plastic chips is treated with hot water (and possibly steam) from a hot sludge thickener 140. The same is true of compartment 54-6 wherein hot water from a hot sludge thickener 140 is utilized. In compartment 54-7 rinsing action is provided utilizing hot or cold water and possibly some treatment chemicals for removing any remnants of previous treatment chemicals or other materials left on the plastic chips.

In compartment 54-8 recycled or cleaned hot or cold water is used by counterflow for a final rinse before the material passes into the end unloading compartment 54-9. As previously explained, agitation of the drum 20 in reversible directions rotate around the longitudinal axis 38, provides intense washing treatment for removing contaminants on the plastic chips and for collecting the same in the liquid wash media. Treatment is accomplished by utilizing water, hot or cold, fresh or recycled, various chemicals and/or steam for additional heating.

The processes utilized in the apparatus 20 are designed normally so that compartments 54-1 and 54-2 comprise a presoaking or soaking phase and in compartments 54-3, 54-4 and 54-5 washing and washing with detergents takes place. Compartments 54-6, 54-7 and 54-8 are used for chemical washing and final rinsing phases. If, for example, a time period required for rinsing in clean water is eight minutes and other wash cycles only require four minutes, two chambers (perhaps 54-7 and 54-8) may be utilized for successive rinsing operations whereas only one chamber is needed in the four minute procedure of washing. After each cycle of oscillatory rotation is complete, the drum 22 is turned one complete revolution (360°) in order to transfer the charges of plastic chips in each compartment of the drum 22 to a next successive compartment for a following treatment phase.

Referring now to FIGS. 8B and 8C, therein is illustrated in a diagrammatic view, a complete or universal municipal type of recycling station wherein initial sorting and storage of plastic products is completed prior to introduction into the unitary universal washing apparatus 20 of the present invention. As viewed in FIG. 8C, the material discharged from the chute 100 of the apparatus 20 is subjected to dewatering and final sorting and drying processes before storage in suitable hoppers. Eventually the reclaimed plastic chips may be introduced into a pellet machine and the hot pellets may then be moved into storage hoppers ready for shipping to other remote locations for re-use. Sludge from the cold and hot sludge thickeners 140 and 174 may be mixed into a equalization unit 176 or holding tank prior to introduction into a dissolved air floatation unit 178 and after treatment in the dissolved air floatation unit 178, the sludge may be fed to a sludge storage tank 144 prior to dewatering and eventual incineration or sludge disposal. The recycled or cleaned liquid medium is returned for use in the cleaning process taking place in the drum 22 of the apparatus 20 whenever possible or desirable.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. Unitary apparatus for removing contaminants from a charge of solid chip-like material, comprising:

container means having an outer wall and adapted for holding a quantity of liquid medium for wetting said charge of said solid material in a floating mass adjacent an upper surface of said liquid medium to facilitate removal of contaminants from surfaces of said material;

agitator means in said container means supported to rotate about an axis spaced above said liquid medium, said agitator means including a plurality of elements having surfaces extending generally radially and spaced outwardly of said axis and spaced inwardly away from said outer wall adapted to downwardly strike the upper surface of said liquid medium and thereafter pass downwardly through said mass of solid chip-like material floating in said liquid medium for forcing said material downwardly toward greater depths in said liquid medium below an upper surface of said liquid medium for washing at least some of said contaminants away from said surfaces of said solid chip-like material for collection into said liquid medium as said agitator means rotates, and means for removing said contaminants from said liquid medium after some of said contaminants are washed away from said surfaces of said solid material.

2. The apparatus of claim 1, including:

means for separating said contaminants that are washed away from said solid material away from said liquid medium.

3. The apparatus of claim 1, wherein:

said agitator means comprises a plurality of basher bars spaced generally parallel of said axis and fixedly mounted in said container means at different distances away from said axis on different angularly spaced radials around said axis.

4. The apparatus of claim 3, wherein:

said basher bars have generally planar faces aligned on said radials outwardly of said axis of rotation.

5. The apparatus of claim 4, wherein:

at least some said basher bars have opposite parallel planar faces and are formed with apertures extending between opposite planar faces for permitting the passage of said liquid medium and said solid chip-like materials therethrough as said basher bars move downwardly through said floating mass of solid chip-like material in liquid medium.

6. The apparatus of claim 3, wherein:

said container means comprises a generally cylindrical chamber having at least one compartment defined between longitudinally spaced apart circular walls normal to said axis; and said basher bars extend between said circular walls and spaced radially outwardly of said axis and are generally parallel thereto.

7. The apparatus of claim 6, including:

a plurality of said cylindrical chambers aligned in sequence along said axis and including a common cylindrical outer wall with said circular walls extending inwardly thereof toward said axis; and transfer means for moving batches of said particulate material from one chamber to a next adjacent chamber upon rotation of said common cylinder wall in one direction about said axis.

8. The apparatus of claim 7, including:

motor means for rotating said container means in opposite directions around said axis.

9. Unitary apparatus for removing contaminants from a charge of solid chip-like material, comprising:

container means for holding a quantity of liquid medium for wetting said charge of said solid material to facilitate removal of contaminants from surfaces of said material;

agitator means in said container means movable to rotate about an axis spaced above said liquid medium, said agitator means comprising a plurality of basher bars fixedly mounted in said container means and spaced apart at different distances from said axis of rotation to pass through said solid material contained in said liquid medium for direct engagement with said solid material forcing the same downwardly toward greater depths in said liquid medium below an upper surface of said medium for washing at least some of said contaminants away from said surfaces of said solid material for collection into said liquid medium, said basher bars having generally planar faces aligned on radials outwardly of said axis of rotation and formed with apertures extending between opposite planar faces for permitting the passage of said liquid medium and said solid materials therethrough as said basher bars move through said liquid medium, said apertures having a minimum cross-sectional flow area spaced between said opposite planar faces that is less than the area of said apertures at said planar faces.

10. The apparatus of claim 9, wherein:

said container means comprises a generally cylindrical chamber having at least one compartment defined between circular walls normal to said axis; and said basher bars extend between said circular walls and are spaced radially outwardly of said axis.

11. The apparatus of claim 10, including:

a plurality of said cylindrical chambers aligned in sequence along said axis and including a common cylindrical outer wall with said circular walls extending inwardly thereof toward said axis; and transfer means for moving batches of said particulate material from one chamber to a next adjacent chamber upon rotation of said common cylinder wall in one direction about said axis.

12. The apparatus of claim 9, including:

motor means for rotating said container means in opposite directions around said axis.

* * * * *